United States Patent
Basel et al.

(10) Patent No.: US 9,348,766 B2
(45) Date of Patent: May 24, 2016

(54) BALANCED P-LRU TREE FOR A "MULTIPLE OF 3" NUMBER OF WAYS CACHE

(75) Inventors: Adi Basel, Haifa (IL); Gur Hildesheim, Haifa (IL); Shlomo Raikin, Ofer (IL); Robert Chappell, Portland, OR (US); Ho-Seop Kim, Portland, OR (US); Rohit Bhatia, Fort Collins, CO (US)

(73) Assignee: Intel Corporation, Santa Clara, CA (US)

(*) Notice: Subject to any disclaimer, the term of this patent is extended or adjusted under 35 U.S.C. 154(b) by 237 days.

(21) Appl. No.: 13/994,690

(22) PCT Filed: Dec. 21, 2011

(86) PCT No.: PCT/US2011/066652
§ 371 (c)(1),
(2), (4) Date: Jun. 14, 2013

(87) PCT Pub. No.: WO2013/095467
PCT Pub. Date: Jun. 27, 2013

(65) Prior Publication Data
US 2014/0215161 A1      Jul. 31, 2014

(51) Int. Cl.
| | |
|---|---|
| G06F 13/00 | (2006.01) |
| G06F 12/12 | (2016.01) |
| G06F 3/06 | (2006.01) |
| G06F 12/00 | (2006.01) |
| G06F 12/08 | (2016.01) |

(52) U.S. Cl.
CPC ............ *G06F 12/122* (2013.01); *G06F 3/0604* (2013.01); *G06F 12/00* (2013.01); *G06F 12/0842* (2013.01); *G06F 12/0864* (2013.01); *G06F 12/124* (2013.01); *G06F 12/125* (2013.01)

(58) Field of Classification Search
None
See application file for complete search history.

(56) References Cited

U.S. PATENT DOCUMENTS

| 7,146,371 | B2 | 12/2006 | Hofstee et al. |
| 8,234,233 | B2 | 7/2012 | Zhou |
| 8,533,129 | B2 | 9/2013 | Kejariwal et al. |
| 2007/0038775 | A1 | 2/2007 | Parekh et al. |
| 2012/0030430 | A1* | 2/2012 | Hayashi ................ 711/128 |

OTHER PUBLICATIONS

PCT International Search Report for PCT Counterpart Application No. PCT/US2011/066652, 3 pgs., (Aug. 30, 2012).

(Continued)

*Primary Examiner* — Midys Rojas
(74) *Attorney, Agent, or Firm* — Nicholson De Vos Webster & Elliott LLP

(57) ABSTRACT

In accordance with embodiments disclosed herein, there are provided methods, systems, mechanisms, techniques, and apparatuses for implementing a balanced P-LRU tree for a "multiple of 3" number of ways cache. For example, in one embodiment, such means may include an integrated circuit having a cache and a plurality of ways. In such an embodiment the plurality of ways include a quantity that is a multiple of three and not a power of two, and further in which the plurality of ways are organized into a plurality of pairs. In such an embodiment, means further include a single bit for each of the plurality of pairs, in which each single bit is to operate as an intermediate level decision node representing the associated pair of ways and a root level decision node having exactly two individual bits to point to one of the single bits to operate as the intermediate level decision nodes representing an associated pair of ways. In this exemplary embodiment, the total number of bits is N−1, wherein N is the total number of ways in the plurality of ways. Alternative structures are also presented for full LRU implementation, a "multiple of 5" number of cache ways, and variations of the "multiple of 3" number of cache ways.

24 Claims, 15 Drawing Sheets

(56) References Cited

OTHER PUBLICATIONS

PCT Written Opinion of the International Searching Authority for PCT Counterpart Application No. PCT/US2011/066652, 6 pgs., (Aug. 30, 2012).

PCT Notification concerning Transmittal of International Preliminary Report on Patentability (Chapter I of the Patent Cooperation Treaty) for PCT Counterpart Application No. PCT/US2011/066652, 8 pgs., (Jul. 3, 2014).

* cited by examiner

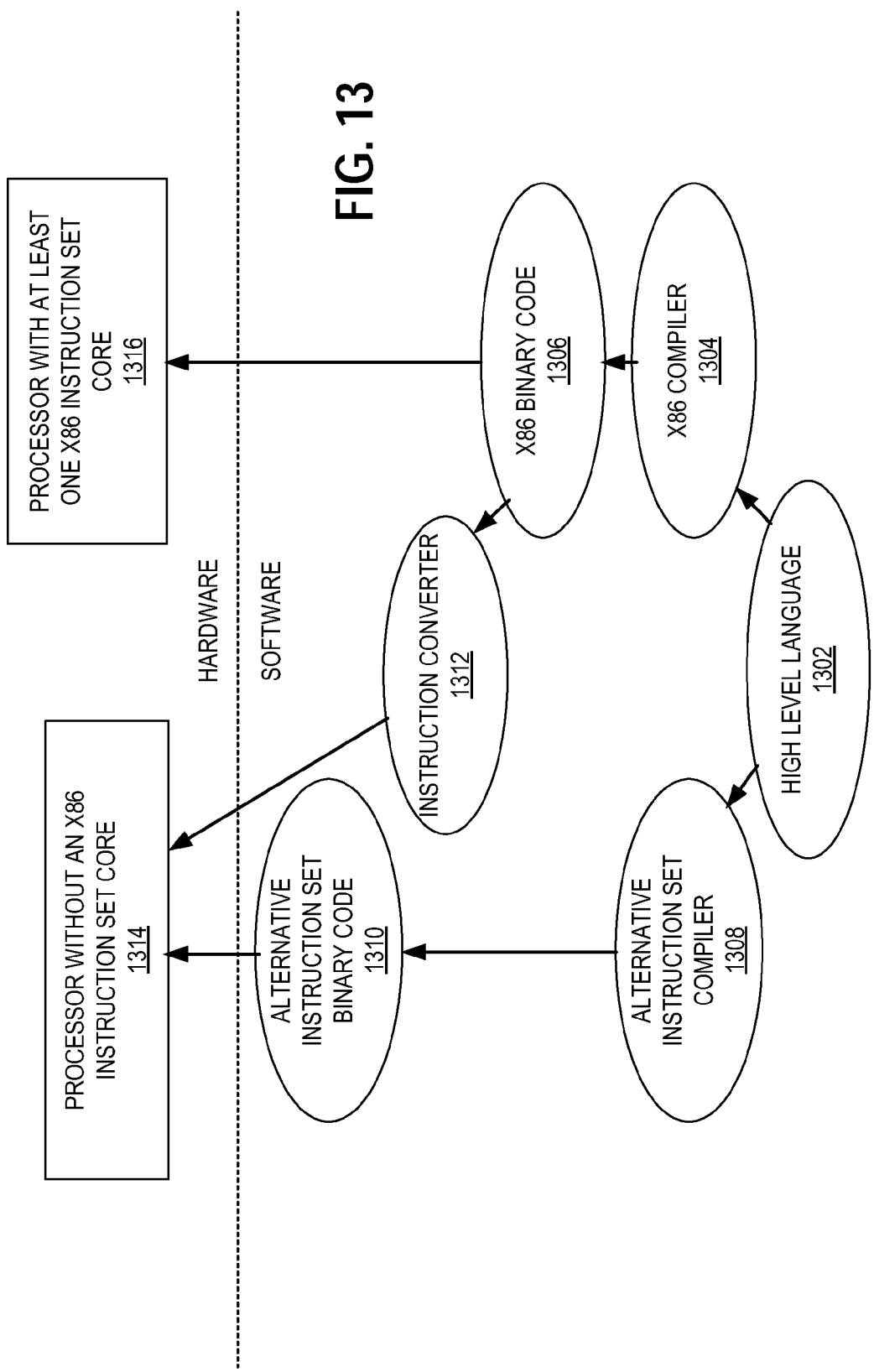

BALANCED P-LRU TREE FOR A "MULTIPLE OF 3" NUMBER OF WAYS CACHE

CROSS-REFERENCE TO RELATED APPLICATIONS

This patent application is a U.S. National Phase Application under 35 U.S.C. §371 of International Application No. PCT/US2011/066652, filed Dec. 21, 2011, entitled A BALANCED P-LRU TREE FOR A "MULTIPLE OF 3" NUMBER OF WAYS CACHE.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The subject matter described herein relates generally to the field of computing, and more particularly, to systems and methods for implementing a balanced pseudo least recently used (PLRU) tree for a "multiple of 3" number of ways cache.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed subject matter.

Least Recently Used (LRU) algorithms discard the least recently used items first, such as the least recently used element in a computing cache. LRU algorithms must therefore keep track of what element was used when. Such tracking can be computationally expensive and space intensive on an implementing circuit if the cache replacement scheme is to operate in accordance with a true LRU algorithm which requires that so called "least recently used" elements are always discarded first. Some LRU compliant implementations utilize "age bits" for cache-lines and track the "Least Recently Used" cache-line based on the age-bits. For example, each time a cache-line is used, the age of all other cache-lines changes.

True LRU compliant implementation may become infeasible due to computing expense and space constraints. Pseudo-LRU (PLRU) may instead be utilized for caches with large associativity. For example, where a scheme that "almost always discards" one of the least recently used items is sufficient, then a PLRU algorithm may be desirable as design constraints may be adhered to with less costly computational expense and lessened circuit space requirements.

Pseudo-LRU generally refers to one of two cache replacement algorithms: tree-PLRU and bit-PLRU.

Tree-PLRU is an efficient algorithm to find an item that most likely has not been accessed very recently, given a set of items and a sequence of access events to the items. A tree-PLRU algorithm operates with the use of a binary search tree for the items in question. Each node of the binary search tree has a one-bit flag indicating "go left" or "go right" to find the searched for pseudo-LRU element. Traversing the binary search tree according to the values of the flags eventually yields the searched for element.

Bit-PLRU stores one status bit for each cache line, sometimes referred to as most recently used bits (MRU-bits). Every access to a line sets its MRU-bit to 1, indicating that the line was recently used. Whenever the last remaining 0 bit of a set of status bits is set to 1, all other bits are reset to 0. Replacement policy due to cache misses then targets the line with the lowest index whose MRU-bit is 0 for replacement (e.g., the pseudo LRU element is discarded and the location is available for a new cache element).

Conventional "power of two" number of ways Pseudo-LRU implementations enjoy well known algorithms and implementations which operate efficiently at near real LRU or fully compliant LRU performance levels. Such Pseudo-LRUs require only a single bit for any node of decision. Such PLRU implementations therefore require a total of n−1 number of bits, in which n is the number of ways. A tree is built with the n−1 bits, resulting in a very balanced tree with performance close to LRU or real LRU tree. Nodes are placed into two groups, and one bit is used to decide which was more recent, then each sub-group into is placed into two groups, and one bit is again used to decide which is more recent, and so on, resulting in a structure having exactly n−1 bits for this power of two tree structure.

Unfortunately, such a structure does not and cannot support a number of ways that is different than the power of two because the nodes cannot be split evenly, and thus, a single bit cannot support a non-even split.

Notwithstanding the existence of conventional power-of-two PLRU implementation models, the optimum point for performance-to-power and performance-to-area on a circuit is not necessarily a power of two. For example, the optimum point may be an odd number in violation to the power-of-two available models or may be a multiple of an odd number which is not a power-of-two. Presently envisioned for new products are 6 way and 12 way caching models, neither of which conforms to a power-of-two model as presently available to industry.

The present state of the art may therefore benefit from systems and methods for implementing a balanced P-LRU tree for a "multiple of 3" number of ways cache as described herein. A "multiple of 5" number of ways cache implementation is additionally described as are variations of the "multiple of 3" number of cache ways.

BRIEF DESCRIPTION OF THE DRAWINGS

Embodiments are illustrated by way of example, and not by way of limitation, and will be more fully understood with reference to the following detailed description when considered in connection with the figures in which:

FIG. 13 illustrates a system to translate instructions according to one embodiment.

DETAILED DESCRIPTION

Figure 1:
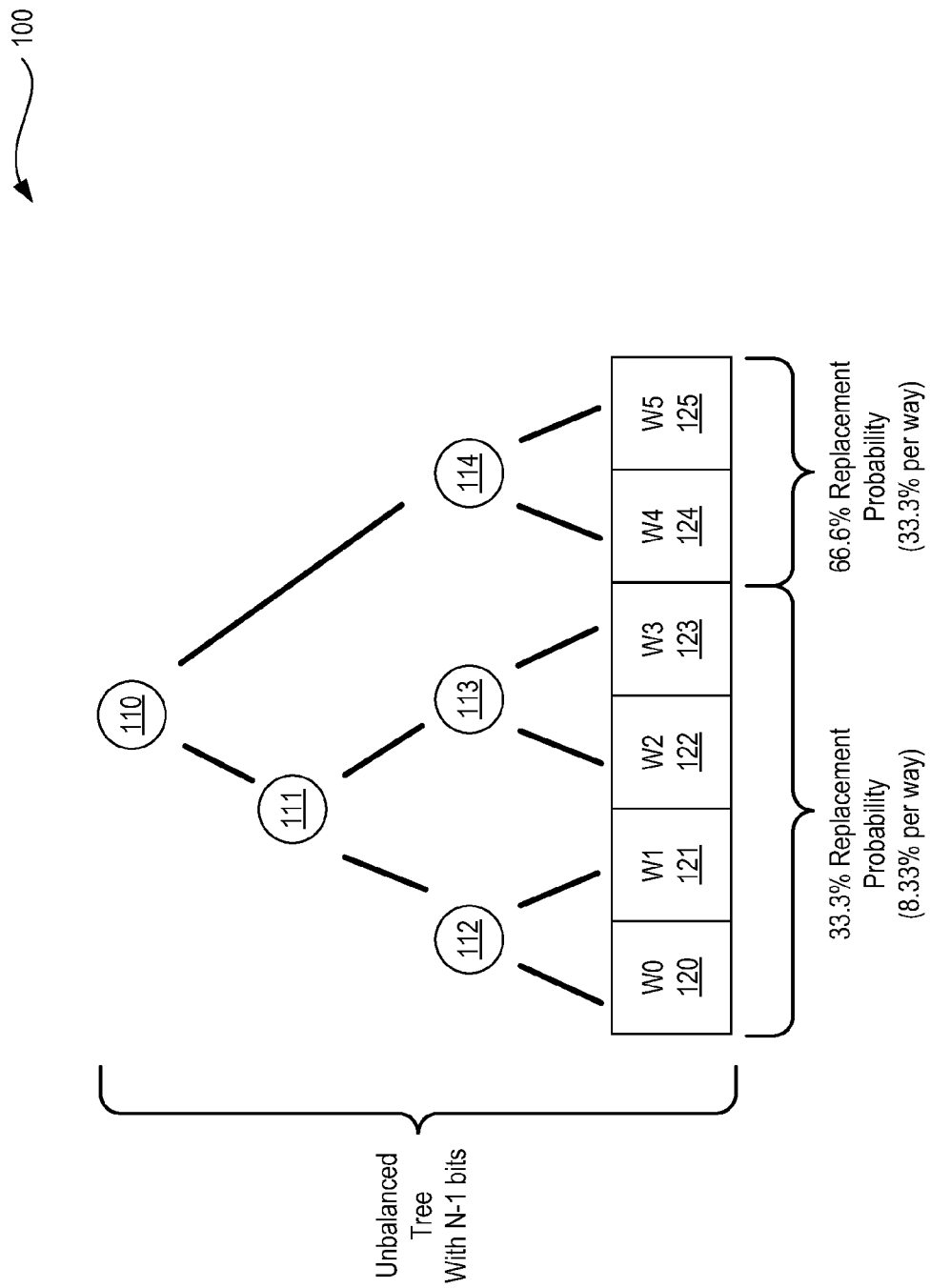
FIG. 1 illustrates an exemplary architecture in accordance with which embodiments may operate.

Described herein are systems and methods for implementing a balanced P-LRU tree for a "multiple of 3" number of ways cache. For example, in one embodiment, such means may include an integrated circuit having a cache and a plurality of ways. In such an embodiment the plurality of ways include a quantity that is a multiple of three and not a power of two, and further in which the plurality of ways are organized into a plurality of pairs. In such an embodiment, means further include a single bit for each of the plurality of pairs, in which each single bit is to operate as an intermediate level decision node representing the associated pair of ways and a root level decision node having exactly two individual bits to point to one of the single bits to operate as the intermediate level decision nodes representing an associated pair of ways. In this exemplary embodiment, the total number of bits is N−1, where N is the total number of ways in the plurality of ways. Alternative structures are also presented for full LRU implementation, "multiple of 5" number of cache ways, and variations of the "multiple of 3" number of cache ways.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled with a computer system bus. The term "coupled" may refer to two or more elements which are in direct contact (physically, electrically, magnetically, optically, etc.) or to two or more elements that are not in direct contact with each other, but still cooperate and/or interact with each other.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1 illustrates an exemplary architecture 100 in accordance with which embodiments may operate. In accordance with the described embodiments, the depicted architecture 100 implements a modified cache having a "power-of-2" number of ways consisting of N−1 number of bits per set, in which N is the number of ways. Each pair of ways 120-125 is represented by a single bit 112-114 indicating the most recently used way and pointing at the other way as a candidate for replacement. For example, in the three pairs of ways depicted, a first pair {W0, W1} 120-121 are represented by single bit 112, a second pair {W2, W3} 122-123 are represented by a single bit 113, and a third pair {W4, W5} 124-125 are represented by a single bit 114. Each of the single bits 112-114 operate as single bit decision nodes for their associated pair of ways.

A similar bit for each two pairs is presented with bit 111 representing the pair of bits 112 and 113 and with bit 110 representing the pair of bits 111 and 114, and so on up to the top of the tree, bit 110 representing the top of the tree in this simplified example.

When creating a cache which has "multiple-of-3" number of ways, the depicted implementation creates an unbalanced P-LRU tree. Each group of three is split into sub groups of 2 and 1, and one bit is indicating the last recently used group. For example, in a cache having 6 ways, there is 1 bit for each pair of ways (as in a normal power-of-two cache) established by bits 112 through 114, one bit to indicate two first pairs of ways 120 through 123 established by bit 111, and one last bit to indicate the sub groups of ways {W0/W1 and W2/W3} and {W4/W5} established by bit 110. The problem with such a modified tree is that it is very unbalanced. Some of the ways have four times the probability to be replaced in comparison to other ways in the same tree. In the example architecture 100, probability to replace a way (124 and 125) from sub-set {W4, W5} is 66.6%, each way individually (124 or 125) having a probability of 33.3% to be replaced. Probability to replace a way (120, 121, 122, and 123) from sub-set {W0, W1, W2, W3} is 33.3%, each way individually (120, 121, 122, or 123) having a probability of just 8.33% to be replaced.

The above technique splits the groups into non-equal quantities. For example, the six ways depicted are split into unequal subgroups of four ways and two ways with a single bit used to determine which group to replace into. The pairs of ways are thus powers of two, and for each pair in the tree, a single bit indicates "left" or "right" or "a" or "b," and so forth.

Other similar groupings are feasible, but also result in an undesirable imbalance of the tree structure, thus resulting in tree structure which is non-symmetrical. For example, given 12 ways, unequal groups of four and eight can be designated, resulting in an N−1 bits usage.

Alternatively, given the six ways from the example above, one option would be to split the six ways into two groups of three and then place one single bit balancing the two groups at the top to indicate "left" or "right" or "a" or "b," etc. Unfortunately, at some level, symmetry must be broken, resulting in a bit controlling subgroups of two ways and one way. Thus, the lack of symmetry is simply shifted down the tree compared to the exemplary structure 100 depicted.

Similarly, twelve ways may be split into subgroups of six and six, then each subgroup of six ways may be split into three and three, and then subsequently split into subgroups of two ways and one way, but no matter the scheme of division, eventually an imbalanced node or tree branch will result. It is this imbalance that results in unbalanced probabilities for replacement in each way.

The individual ways are equal in other regards, and thus, it is not desirable for certain ways to enjoy a low replacement probability which is just one fourth that of other ways in the same tree. Thus, simply modifying a conventional power of two binary tree structure to support a multiple of three ways requirement is not a practical solution where more equal probability of replacement for similarly situated ways is required.

Another alternative is to increase the number of bits that are used. Thus, given six ways, three groups of two can be designated, and then in an upper node, three bits in the upper level can be utilized and real LRU can be complied with the real LRU remembers at all times the order of replacements for all ways. For example, the real LRU tracks how is way 1 against 2, 1 against 3, and 2 against 3, thus tracking the exact order of hitting the various ways. Unfortunately, such a scheme requires more bits. Because more bits are required for such an implementation, it is rare to find real or truly compliant LRU implementations.

For example, given six ways split them into three groups of two, one bit per pair is required in addition to three bits in the upper level, thus resulting in "N" total bits, where "N" is the number of ways, and not "N−1" bits. It may not always be desirable to utilize more than N−1 bits to implement the tree as any more than N−1 bits consumes extra space on an implementing circuit. In other situations, LRU accuracy requiring full or true LRU compliance may be desirable over the negative implications to space requirements on an implementing circuit, and thus, an exemplary architecture having balanced tree structure with N bits utilizing a hybrid real LRU and PLRU model is described as an alternative embodiment.

Figure 2A:
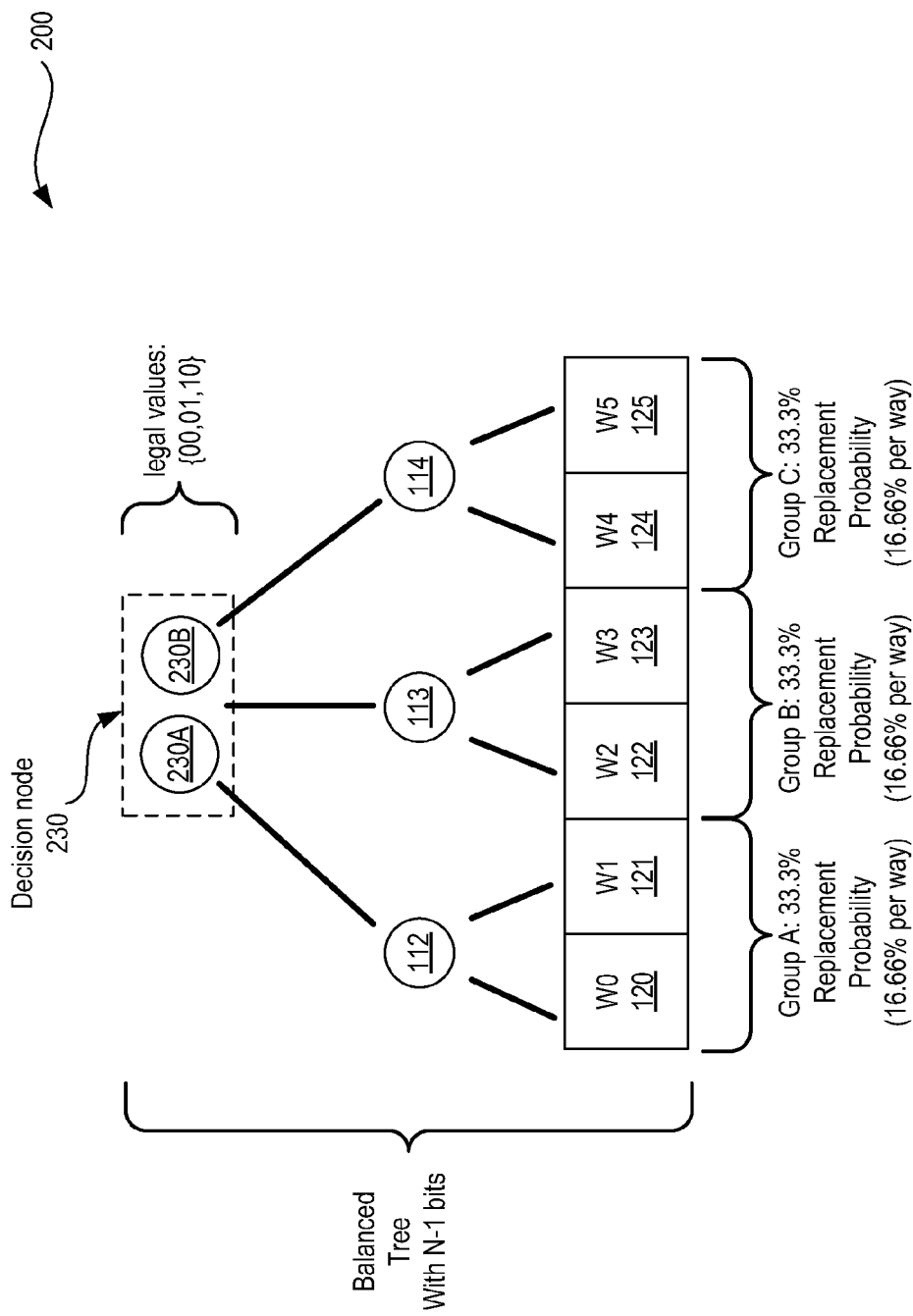
FIG. 2A illustrates an alternative exemplary architecture in accordance with which embodiments may operate.

FIG. 2A illustrates an alternative exemplary architecture 200 in accordance with which embodiments may operate.

Each pair of ways 120-125 is again represented by a single bit 112-114 indicating the most recently used way and pointing at the other way as a candidate for replacement. For example, in the three pairs of ways depicted, a first pair {W0, W1} 120-121 are represented by single bit 112, a second pair {W2, W3} 122-123 are represented by a single bit 113, and a third pair {W4, W5} 124-125 are represented by a single bit 114. Each of the single bits 112-114 operate as single bit decision nodes for their associated pair of ways. This is consistent with the exemplary structure 100 set forth at FIG. 1.

However, exemplary structure 200 of FIG. 2A is balanced and notably, retains N−1 bits in support of the non-power of two ways, specifically, a multiple of three ways.

Thus, the exemplary six ways are presented within a balanced tree with only five bits per set, or N−1 bits, where the number of ways is six and further in which the number of ways is not a power of two and is a multiple of three. From the symmetry depicted, it is easy to see that the tree is balanced and each way has an equal probability to be replaced. Such a scheme is thus expandable to any power-of-three number of ways (9, 18, 27, etc).

As depicted, the six ways 120 through 125 are split into three groups, each of which are themselves a power of two. Thus, each sub group in isolation implements a regular N−1 PLRU tree.

Thus, given six ways {W1, W2, W3, W4, W5, W6} 120-125, the ways are split into pairs or subgroups of two. In the uppermost level, two bits 230A and 230B collectively operate together as a decision node 230. This two-bit 230A-230B decision node 230 has more information capacity due to its two bits 230A-230B in contrast to a node having only a single bit. Thus, it is made possible that any value of the two bits points the way to replace, either left to bit 112 leading to {W0/W1} 120-121, center bit 113 leading to {W2/W3} 122-124, or right bit 114 leading to {W4/W5} 124-125.

In such an example, one of the four possible values is not required, and is thus made illegal. For example, in this depiction, "11" is made illegal, and thus, legal values of the decision node 230 are "00," "01," and "10," with "11" remaining unused, however, a different combination of values may be selected for mapping to the nodes or ways.

Utilizing the depicted architecture 200, an update operation may be implemented as follows:

When used, hit, or replaced:

Group A writes "00" to decision node 230;
Group B writes "01" to decision node 230; and
Group C writes "10" to decision node 230.

Utilizing the depicted architecture 200, a replace operation may be implemented as follows in consideration of the present value of the decision node 230:

Given a present value of "00," group B is replaced;
Given a present value of "01," group C is replaced
Given a present value of "10," group A is replaced.

As a result, each group causes its right hand side group to be replaced. For example, when the group {W0/W1} 120-121 controlled by leftmost bit 112 is hit, the next replace will operate on group {W2/W3} controlled by the center bit 113; when the group {W2/W3} controlled by the center bit 113 is hit, the next replace will operate on group {W4/W5} 124-125 controlled by the rightmost bit 114; and when the group {W4/W5} 124-125 controlled by the rightmost bit 114 is hit, the next replace will operate on the group {W0/W1} 120-121 controlled by leftmost bit 112, and so on.

Cache hits cause an update to the decision node 230 and specifically update the bits 230A-B of the decision node 230. A cache hit carries the decision node value with it, and when hit, the new value carried with the cache hit is written to the decision node 230 such that the new value indicating the node to the right hand side is written into the decision node. The node to the right hand side may, as described above, will loop around to the first or leftmost node when a present value of the decision node indicates a rightmost node.

Multiple decision nodes may exist in a single tree, and not all need be updated given a cache hit. For example, if W0 120 is hit then it is known that the pair of ways {W0/W1} 120-121 was last updated, but there is no information with regard to {W2/W3} 122-124 or {W4/W5} 124-125. It is not necessary to touch or update the remaining branches of the tree associated with {W2/W3} 122-124 and {W4/W5} 124-125 because only branch {W0/W1} 120-121 having the cache hit W0 is required to fulfill the cache hit. Decision node 230 will be updated to indicate the next or the right hand candidate given the cache hit (e.g., because group A is hit, "00" is written to decision node 230, causing a subsequent replacement to target group B as noted in the exemplary implementation of a replace operation as noted above). Thus, there is no need to touch the remaining decision nodes of a tree which are not involved with the present cache hit.

In such a way, an extremely unbalanced tree with poor probability of replacement is made into a much more balanced probability tree. Statistical probability is very good which will meet a great many of design requirements given the ability to target optimal space-to-performance constraints, although, it is possible that some replacements are not fully LRU compliant.

For example, given a least frequently used element in way pair {W0/W1} 120-121 and a more frequent usage of way pairs to {W2/W3} 122-124 and {W4/W5} 124-125, the described model will target more frequently used way pairs to {W2/W3} 122-124 and {W4/W5} 124-125 over way pair {W0/W1} 120-121 as the decision node 230 when updated with the next right hand node value. For example, given a hit to way pair {W4/W5} 124-125, the next right hand node value targeted for replacement will be bit 112 or the left most bit which corresponds to a present value of "10" at decision node 230, thus causing a replacement targeting the way pair {W0/W1} 120-121 subset. Such a replacement would be correct in this example where way pair {W0/W1} 120-121 is the least recently used.

Conversely, given a least frequently used element in way pair {W0/W1} 120-121 and a more frequent usage of way pairs to {W2/W3} 122-124 and {W4/W5} 124-125, consistent with the preceding example, a hit to way pair {W2/W3} 122-124 will cause the next right hand node value targeted for replacement to be bit 114 or the right most bit which corresponds to a present value of "01" at decision node 230, thus causing a replacement targeting the way pair {W4/W5} 124-125 subset. Such a replacement would be not be LRU compliant in this example where way pair {W0/W1} 120-121 is the least recently used.

Notwithstanding the above potential for non-compliant LRU operation, the statistical distribution of cache hits is very good and performs at a near LRU compliant level.

It is important to note that the above described scheme does not implement a "round robin" type designation scheme which would result in a perfectly flat distribution across the nodes. To the contrary, some of the nodes will be subject to cache hits more often than others resulting in other nodes being the subject of replacement (e.g., eviction) more than others. For example, given a repeating cache hit on a particular, sub-branch of the tree, such as the way pair {W4/W5} 124-125 subset, replacement will be repetitively targeted against way pair {W0/W1} 120-121 with the middle way pair {W2/W3} 122-124 simply being ignored as it is not the subject of a cache hit or designated for replacement.

Figure 2B:
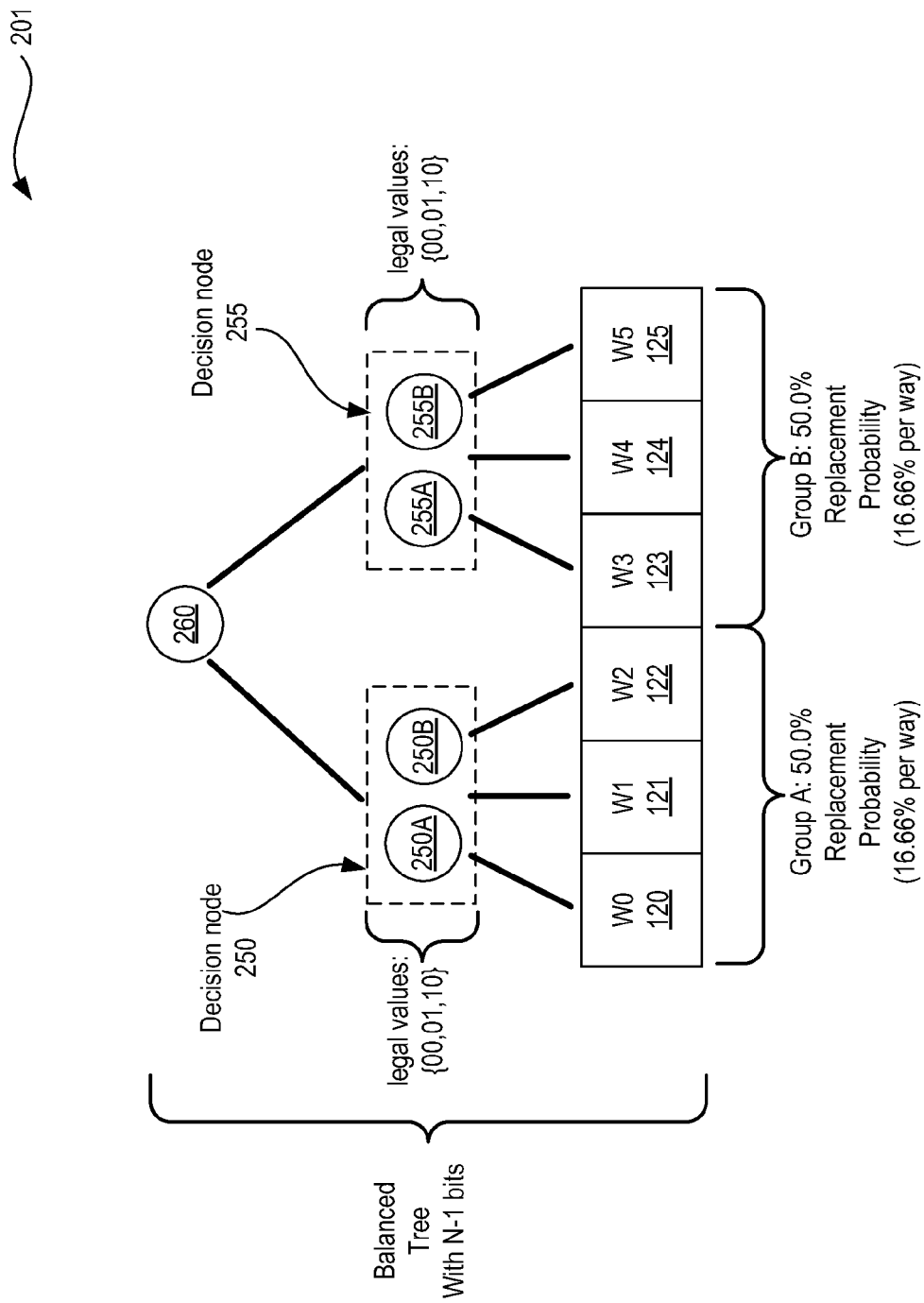
FIG. 2B illustrates another alternative exemplary architecture in accordance with which embodiments may operate.

FIG. 2B illustrates another alternative exemplary architecture 201 in accordance with which embodiments may operate.

In this example, power of two groups of three are set forth for the six ways depicted. This architecture 201 is similar to that which is set forth by architecture 200 of FIG. 2A except that the six ways are split into power of two groups of threes rather than groups of two. For each group of three ways, two bits collectively establish a decision node as described above, except that the decision nodes 250-255 represent individual ways rather than intermediate nodes which in turn represent the individual ways 120-125. Additionally, the multi-bit decision nodes 250 and 255 are not established at an intermediate level rather than a top or root level.

As can be seen, there are no longer pairs of ways. Instead, sets of three ways each are established, in which a first group {W0, W1, W2} are represented by decision node 250 having bits 250A and 250B therein. A second set of three ways establishes the second group depicted {W3, W4, W5} represented by decision node 255 having bits 255A and 255B set forth therein. Each of decision nodes 250 and 255 may again have legal values of "00," "01," and "10," with "11" remaining unused. The intermediate level decision nodes 250 and 255 represent a power of two quantity sub-group. In this example, the intermediate level decision nodes 250 and 255 have a quantity of "2" which is a power of "2." Other powers of two are also permissible. A single bit 260 represents the top or root of the depicted tree, in which the bit sets forth a binary decision consistent with the single bits described above, such that the single bit 260 operates as a root level single-bit decision node to indicate "left" or "right" or "a" or "b," and so forth.

Here, the two groups of three ways each have a 50.0% probability for replacement, and each of the individual ways 120-125 within the respective groups will have an individual replacement probability of 16.66%, thus providing a balanced tree with a statistically balanced replacement distribution.

The depicted tree retains the feature of an N−1 bits implementation where N is the number of ways, where N is not a power of two, where N is a multiple of three, and further in which the two-bit decision node mechanism is implemented not at the root of the tree, but at an intermediate level. Where sufficient ways exist, such more than one decision node (e.g., 250 and 255) will additionally be required at the intermediate level.

Given the available options, a processor, such as a silicon integrated circuit which implements the proposed PLRU scheme can simulate which of the schemes is most computationally efficient. The better scheme can be selected without any change to the number of bits required, and thus no change to the required space on the implementing circuit. The optimal selection will depend upon the usage model and it is envisioned that the scheme can be selectable post production given the N−1 implementing bits for the circuit remains the same.

In accordance with the described architecture 201, a root node 260 indicates which of two subsets represented at an intermediate level by either decision node 250 or decision node 255 is least recently used, and that subset, represented by either 250 or 255 is responsively selected. Inquiry to the selected subset represented at the intermediate level by 250 or 255 indicates which of three ways is to be replaced. For example, decision node 250 may have values of 00, 01, and 10, in which 00 causes a replace of W1 121, in which 01 causes a replace of W2 122, and in which 10 causes a replace of W0 120. Intermediate level decision node 255 operates similarly, in which values of 00, 01, and 10 are considered legal values with "11" remaining unused, and in which 00 causes a replace of W3 123, in which 01 causes a replace of W4 124, and in which 10 causes a replace of W5 125.

A cache hit would arrive at the root node 260 and be directed "left" or "right" to the appropriate branch, upon which the intermediate level decision node 250 or 255 indicates the appropriate way 120-125 and further in which the cache hit causes the value of the decision node 250 or 255 to be updated with a value representing the way to the right hand side of the way having the cache hit. For example, with regard to intermediate level decision node 250, a cache hit to W1 120 causes a write of "00" to decision node 250, thus indicating W1 121 is next to be targeted for replacement. A subsequent cache hit again to W1 120 would once again cause a write of "00" to decision node 250, thus indicating W1 121 is next for replacement, where as a cache hit to another of the ways 121 or 122 would change the next targeted way 120-122 for replacement.

Thus, decision nodes 250 and 255 may implement the following scheme for cache hit operations and cache replacement (eviction) operations:

Hits to W0 writes "00" to decision node 250 representing group A;
Hits to W1 writes "01" to decision node 250 representing group A;
Hits to W2 writes "10" to decision node 250 representing group A;
Hits to W3 writes "00" to decision node 255 representing group B;
Hits to W4 writes "01" to decision node 255 representing group B;
Hits to W5 writes "10" to decision node 255 representing group B;
Given a present value of "00," at decision node 250 representing group A, W1 is replaced;
Given a present value of "01," at decision node 250 representing group A, W2 is replaced;
Given a present value of "10," at decision node 250 representing group A, W0 is replaced;
Given a present value of "00," at decision node 255 representing group B, W4 is replaced;
Given a present value of "01," at decision node 255 representing group B, W5 is replaced; and
Given a present value of "10," at decision node 255 representing group B, W3 is replaced.

Thus, the two-bit decision node is shifted down into an intermediate level of the tree and then the way designated to replace is shifted right on a cache hit. Such a structure is applicable to not just six ways, but also 12 ways, 24 ways, and so forth.

Figure 3:
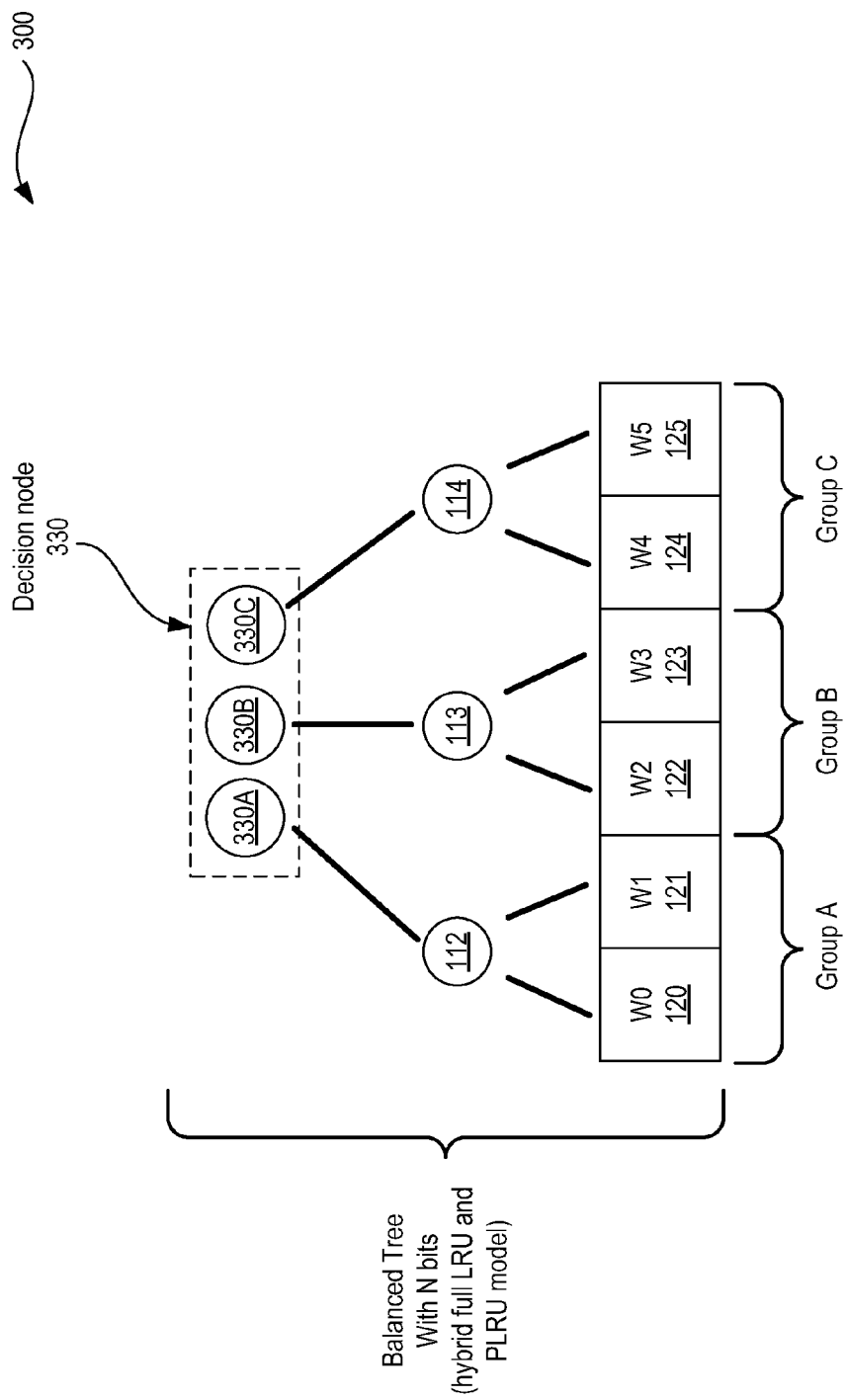
FIG. 3 illustrates another alternative exemplary architecture in accordance with which embodiments may operate.

FIG. 3 illustrates another alternative exemplary architecture 300 in accordance with which embodiments may operate. In particular, a top level decision node 330 is depicted having three individual bits 330A, 330B, and 330C. Additionally depicted are three pairs of ways, a first pair {W0, W1} 120-121 are represented by single bit 112, a second pair {W2, W3} 122-123 are represented by a single bit 113, and a third pair {W4, W5} 124-125 are represented by a single bit 114. Each of the single bits 112-114 operate as single bit decision nodes for their associated pair of ways. The resulting structure creates a balanced tree with N bits, where N is the number of ways and in which the number of ways is not a power of two and further in which the root or top level utilizes a decision node 330 with three bits having full real LRU information capacity and individual bits 112, 113, and 114 at the intermediate level having pseudo-LRU information capacity. Thus, the architecture 300 is a hybrid real LRU and PLRU model.

This hybrid architecture 300 utilizes three bits 330A-C to establish a decision node 330 at the top level and to establish real LRU information capacity at the top level in comparison to architecture 200 as is set forth at FIG. 2A. Implementing a three-bit decision node 330 solution at an intermediate level is not desirable as additional bits would be required at each instance of the three-bit decision node at the intermediate level. As depicted, only one additional bit is required for the entire architecture 300 implementing the hybrid tree, thus resulting in N bits being required, where N is the number of ways, rather than N−1 bits as set forth in the previously described examples of architectures 200 and 201.

In contrast to the architectures of 200 and 201 where the various branches enjoy a statistically appropriate distribution but nevertheless may encounter mistakes, such as the replacement of a non-LRU entity, the three-bit 330A-C decision node 330 implementation as shown enables full information about the three group's sub-groups, thus establishing real LRU compliance at the root level, despite only PRLU information capacity at the subordinate level(s).

For example, the single bit 330A on the left hand side of decision node 330 can distinguish between a left and a middle group as being the LRU candidate. Similarly, the single bit 330B in the middle of decision node 330 can distinguish between the middle group and the right group as being the LRU candidate. And the single bit 330C on the right hand side of decision node 330 can distinguish between a left group and the right group as being the LRU candidate.

Thus, with the three bits 330A-C of decision node 330, it is possible to have full information about which of the three groups is actually the least used group or the LRU candidate, rather than which of multiple groups is the statistically appropriate among the multiple groups for selection as an LRU candidate.

An update operation for the decision node 330 having the three bits 330A-C is as follows: First the previous value is determined in accordance with the cache hit. Where {W0, W1} 120-121 is hit, the value of the leftmost bit 330A and the rightmost bit 330C of the decision node 330 are updated to reflect the new value based on the hit, but the center bit 330B of decision node 330 need not be updated because the center bit 330B is for distinguishing between the middle group and the right group as being the LRU candidate. Where {W2, W3} 122-123 is hit, the value of bit 330A and bit 330B of the decision node 330 are updated to reflect the new value based on the hit, but bit 330C of decision node 330 need not be updated because bit 330C is for distinguishing between the right group and the left group as being the LRU candidate. Where {W4, W5} 124-125 is hit, the value of bit 330B and bit 330C of the decision node 330 are updated to reflect the new value based on the hit, but bit 330A of decision node 330 need not be updated because bit 330A is for distinguishing between the left group and the middle group as being the LRU candidate.

Any hit causes an update to two of the three bits 330A-C in the decision node 330, and thus, it is necessary to know or determine the previous value because there is always one of the three bits that are not updated.

Such a structure solves the potential for mistaken LRU candidates and thus provides the hybrid architecture 300 with improved reliability to determine the LRU candidate because full information capacity is provided; however, implementation of the tree requires an additional bit as a trade-off for the improved accuracy. Thus, some analysis may be appropriate to determine whether space on an implementing circuit is more important than improved accuracy or visa-versa.

The hybrid full LRU/PLRU model set forth by architecture 300 is expandable by having an equal number of bits for the number of ways to update the full LRU information.

Figure 4:
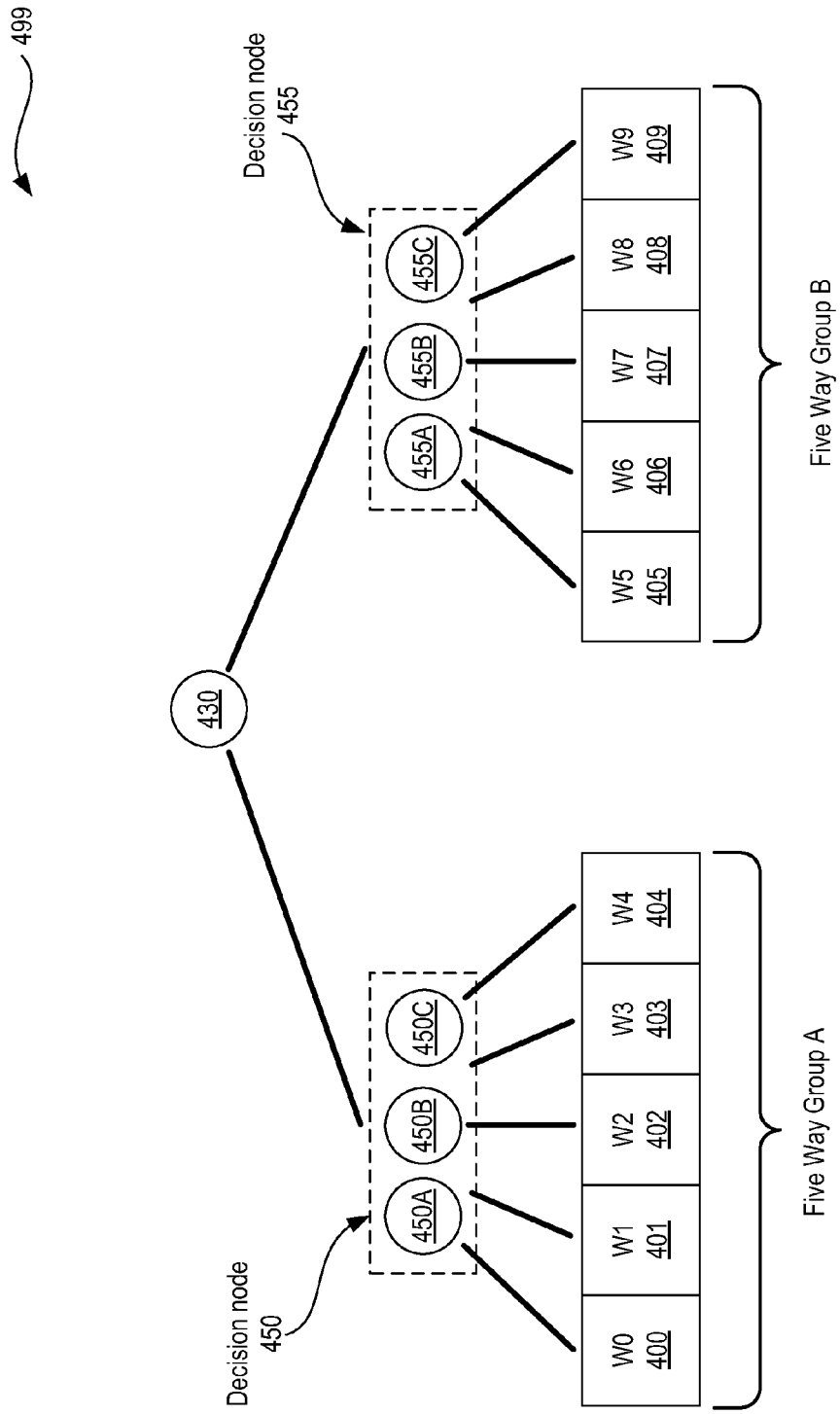
FIG. 4 illustrates another alternative exemplary architecture in accordance with which embodiments may operate.

FIG. 4 illustrates another alternative exemplary architecture 499 in accordance with which embodiments may operate. Root node 430 is a single bit decision node. Two multi-bit decision nodes 450 and 455 are established at the intermediate level. A first decision node 450 having three single bits therein 450A, 450B, and 450C which represent a first group of five ways {W0, W1, W2, W3, W4} represented as elements 400, 401, 402, 403, and 404 respectively. A second decision node 455 having three single bits therein 455A, 455B, and 455C is also depicted, representing a second group of five ways {W5, W6, W7, W8, W9} represented as elements 405, 406, 407, 408, and 409 respectively.

In this multiple of five ways example, the architecture 499 implements a balanced tree for a multiple of five ways in which the multiple of five ways is not a power of two and further in which decision nodes 450 and 455 at an intermediate level contain exactly three individual bits each, 450A-C and 455A-C, capable to provide full LRU information capacity for a group of five ways.

As shown, the tree is split into groups of five with the left or right branch of the tree being selected according to the single bit root node 430. For each group of five ways, three individual bits 450A-C or 455A-C constitute a decision node 450 or 455. The Decision nodes 450 and 455 are capable to choose which of the subordinate five ways in its corresponding group are to be replaced. Each cache hit or cache replace of a one of the ways 400-409 cause the associated decision node 450 or 455 to point on the next way to the right hand side.

An update operation for any of ways 400-409 is implemented as follows:

Hit of W0 (400) writes "000" into the three individual bits 450A-C of decision node 450;
Hit of W1 (401) writes "001" into the three individual bits 450A-C of decision node 450;
Hit of W2 (402) writes "010" into the three individual bits 450A-C of decision node 450;
Hit of W3 (403) writes "011" into the three individual bits 450A-C of decision node 450;
Hit of W4 (404) writes "100" into the three individual bits 450A-C of decision node 450;
Hit of W5 (405) writes "000" into the three individual bits 455A-C of decision node 455;
Hit of W6 (406) writes "001" into the three individual bits 455A-C of decision node 455;
Hit of W7 (407) writes "010" into the three individual bits 455A-C of decision node 455;
Hit of W8 (408) writes "011" into the three individual bits 455A-C of decision node 455; and
Hit of W9 (409) writes "100" into the three individual bits 455A-C of decision node 455.

A replace operation for any of ways 400-409 is implemented as follows:

Replace operation to a way of decision node 450 with a present value of "000" replaces W1 (401);
Replace operation to a way of decision node 450 with a present value of "001" replaces W2 (402);
Replace operation to a way of decision node 450 with a present value of "010" replaces W3 (403);
Replace operation to a way of decision node 450 with a present value of "011" replaces W4 (404);
Replace operation to a way of decision node 450 with a present value of "100" replaces W0 (400);
Replace operation to a way of decision node 455 with a present value of "000" replaces W6 (406);
Replace operation to a way of decision node 450 with a present value of "001" replaces W7 (407);
Replace operation to a way of decision node 450 with a present value of "010" replaces W8 (408);
Replace operation to a way of decision node 450 with a present value of "011" replaces W9 (409); and
Replace operation to a way of decision node 450 with a present value of "100" replaces W5 (405).

Implementation options of the described architecture 499 provide options to split the ways into five groups of two instead of powers of two to the number of ways, N, and additionally enable a fully compliant LRU node at the intermediate level having a group of five ways as subordinates.

Figure 5A:
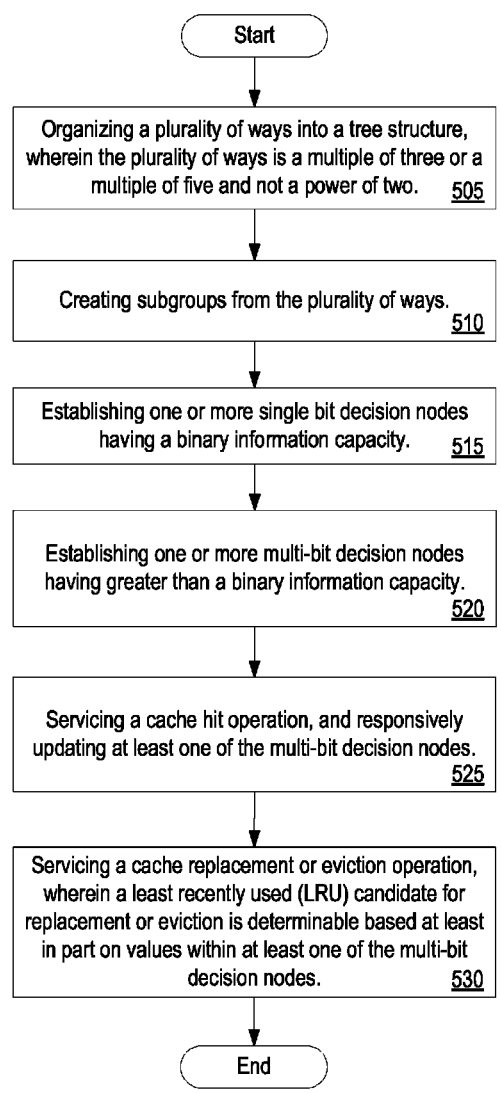
FIG. 5A is a flow diagram illustrating a method for implementing a balanced P-LRU tree for a "multiple of 3" or "multiple of 5" number of ways cache in accordance with described embodiments.

FIG. 5A is a flow diagram illustrating a method for implementing a balanced P-LRU tree for a "multiple of 3" or "multiple of 5" number of ways cache in accordance with described embodiments. Method 500 may be performed by processing logic that may include hardware (e.g., circuitry, dedicated logic, programmable logic, microcode, etc.). The numbering of the blocks presented is for the sake of clarity and is not intended to prescribe an order of operations in which the various blocks must occur.

Method 500 begins with processing logic for organizing a plurality of ways into a tree structure, in which the plurality of ways is a multiple of three or a multiple of five and not a power of two (block 505).

At block 510, processing logic creates subgroups from the plurality of ways.

At block 515, processing logic establishes one or more single bit decision nodes having a binary information capacity.

At block 520, processing logic establishes one or more multi-bit decision nodes having greater than a binary information capacity.

At block 525, processing logic services a cache hit operation, and responsively updating at least one of the multi-bit decision nodes.

At block 530, processing logic services a cache replacement or eviction operation, in which a least recently used (LRU) candidate for replacement or eviction is determinable based at least in part on values within at least one of the multi-bit decision nodes.

Figure 5B:
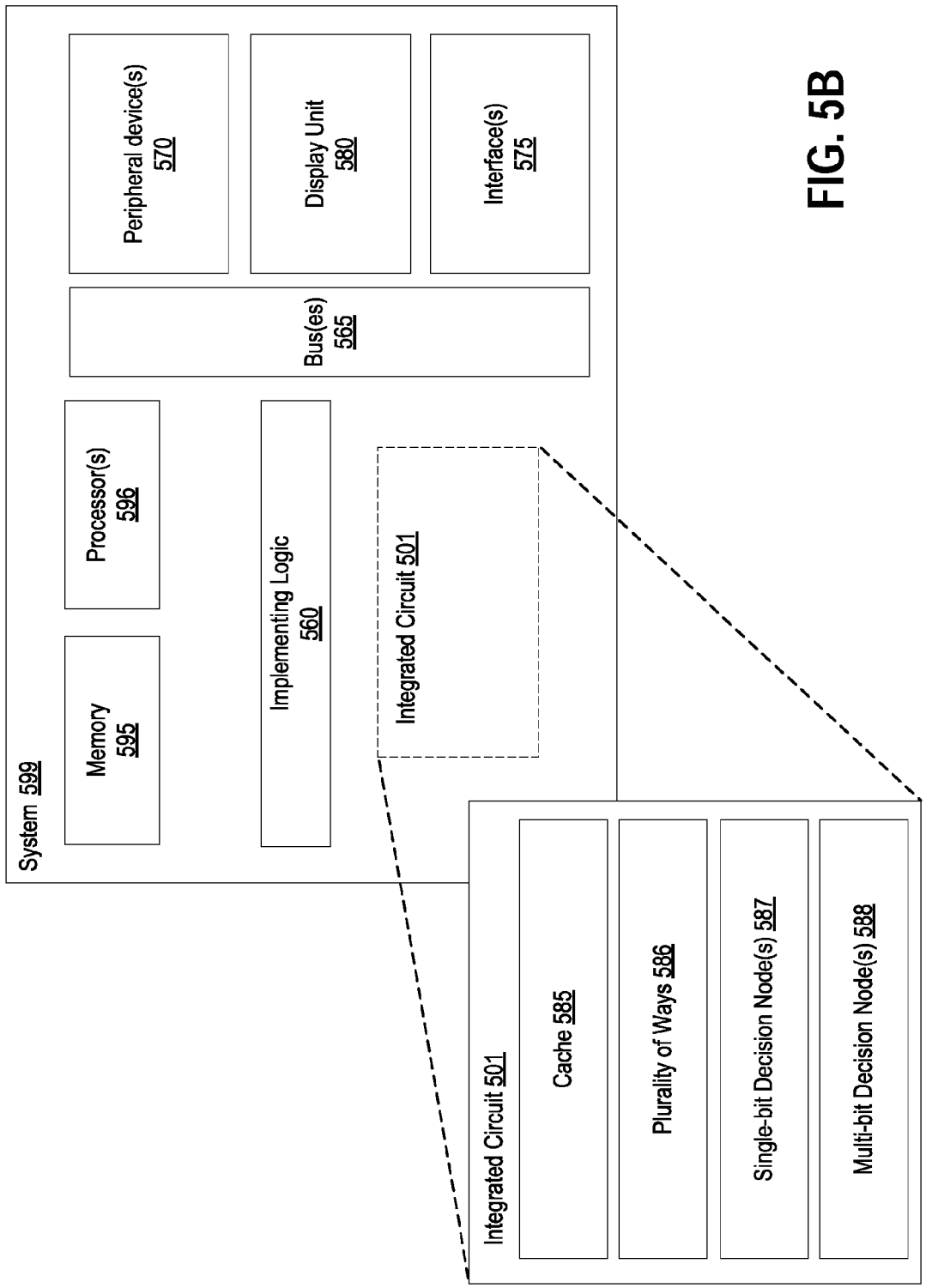
FIG. 5B shows a diagrammatic representation of a system in accordance with which embodiments may operate, be installed, integrated, or configured.

FIG. 5B shows a diagrammatic representation of a system 599 in accordance with which embodiments may operate, be installed, integrated, or configured.

In one embodiment, system 599 includes a memory 595 and a processor or processors 596. For example, memory 595 may store instructions to be executed and processor(s) 596 may execute such instructions. Processor(s) 596 may also implement or execute implementing logic 560 having logic to implement the methodologies discussed herein. System 599 includes communication bus(es) 565 to transfer transactions, instructions, requests, and data within system 599 among a plurality of peripheral device(s) 570 communicably interfaced with one or more communication buses 565 and/or interface(s) 575. Display unit 580 is additionally depicted within system 599.

Distinct within system 599 is Integrated circuit 501 which may be installed and configured in a compatible system 599, or manufactured and provided separately so as to operate in conjunction with appropriate components of system 599.

In accordance with one embodiment, system 599 includes at least a display unit 580 and an integrated circuit 501. The integrated circuit 501 may operate as, for example, a processor or as another computing component of system 599. In such an embodiment, the integrated circuit 501 of system 599 includes at least: a cache 585, a plurality of ways 586, in which the plurality of ways comprises a quantity that is a multiple of three and not a power of two, and further in which the plurality of ways are organized into a plurality of pairs. Such an embodiment further includes a single bit for each of the plurality of pairs, in which each single bit is to operate as an intermediate level decision node 587 representing the associated pair of ways, a root level decision node comprised of exactly two individual bits 588 to point to one of the single bits to operate as the intermediate level decision nodes representing an associated pair of ways, and in which the total number of bits is N−1, where N is the total number of ways in the plurality of ways.

In one embodiment, system 599 embodies a tablet or a smartphone and the display unit 580 is a touchscreen interface for the tablet or the smartphone. In such an embodiment, the integrated circuit 501 is incorporated into the tablet or smartphone, for example, as a processor or other computing component for the tablet or smartphone.

In some embodiments, the integrated circuit 501 exists separately from the system 599. For example, in one embodiment, an integrated circuit 501 separate from system 599 includes a cache; a plurality of ways, in which the plurality of ways includes a quantity that is a multiple of three and not a power of two, and in which the plurality of ways are organized into a plurality of pairs. Such an integrated circuit 501 further includes a single bit for each of the plurality of pairs, in which each single bit is to operate as an intermediate level decision node representing the associated pair of ways; and a root level decision node with exactly two individual bits to point to one of the single bits to operate as the intermediate level decision nodes representing an associated pair of ways; and in which the total number of bits is N−1, where N is the total number of ways in the plurality of ways.

In an alternative embodiment, an integrated circuit 501 separate from system 599 includes a cache and a plurality of ways, in which the plurality of ways includes a quantity that is a multiple of three and not a power of two, and in which the plurality of ways are organized into a subgroups of three ways each. Such an integrated circuit 501 further includes an intermediate level decision node representing each of the subgroups of three ways, in which each intermediate level decision node includes exactly two individual bits to point to one of the three ways in the subgroup associated with the intermediate level decision node; a root level decision node having exactly one single bit to point to one of two subordinate decision nodes; and in which the total number of bits is N−1, where N is the total number of ways in the plurality of ways.

In yet another alternative embodiment, an integrated circuit 501 separate from system 599 includes a cache and a plurality of ways, in which the plurality of ways includes a quantity that is a multiple of three and not a power of two, and in which the plurality of ways are organized into a plurality of pairs. Such an embodiment further includes a single bit for each of the plurality of pairs, in which each single bit is to operate as an intermediate level decision node representing the associated pair of ways; and a root level decision node having exactly three individual bits to point to one of the single bits to operate as the intermediate level decision nodes representing an associated pair of ways. In such an integrated circuit 501 the exactly three individual bits are to point to one of the single bits establish full least recently used (LRU) state information for the intermediate level decision nodes representing the associated pairs of ways. In such an embodiment, the total number of bits is N, where N is the total number of ways in the plurality of ways.

In still another alternative embodiment, an integrated circuit 501 separate from system 599 includes a cache and a plurality of ways, in which the plurality of ways includes a quantity that is a multiple of five and not a power of two, and in which the plurality of ways are organized into a subgroups of five ways each. Such an integrated circuit 501 further includes an intermediate level decision node representing each of the subgroups of five ways, in which each intermediate level decision node includes exactly three individual bits to point to one of the five ways in the subgroup associated with the intermediate level decision node; and a root level decision node having exactly one single bit to point to one of two subordinate decision nodes.

In accordance with at least one embodiment, each of the plurality of ways includes a stored cache element within the cache of the integrated circuit.

In accordance with at least one embodiment, the plurality of ways are arranged into a tree structure which is symmetrically balanced.

In accordance with at least one embodiment, the integrated circuit implements a cache memory circuit for one of a tablet computing device or a smartphone.

In accordance with at least one embodiment, a decision node comprised of exactly three individual bits establishes full LRU state information in combination with the one or more intermediate level decision nodes establishing pseudo LRU (PLRU) state information thus constituting a hybrid real LRU and PLRU model for a plurality of ways.

Figure 6:
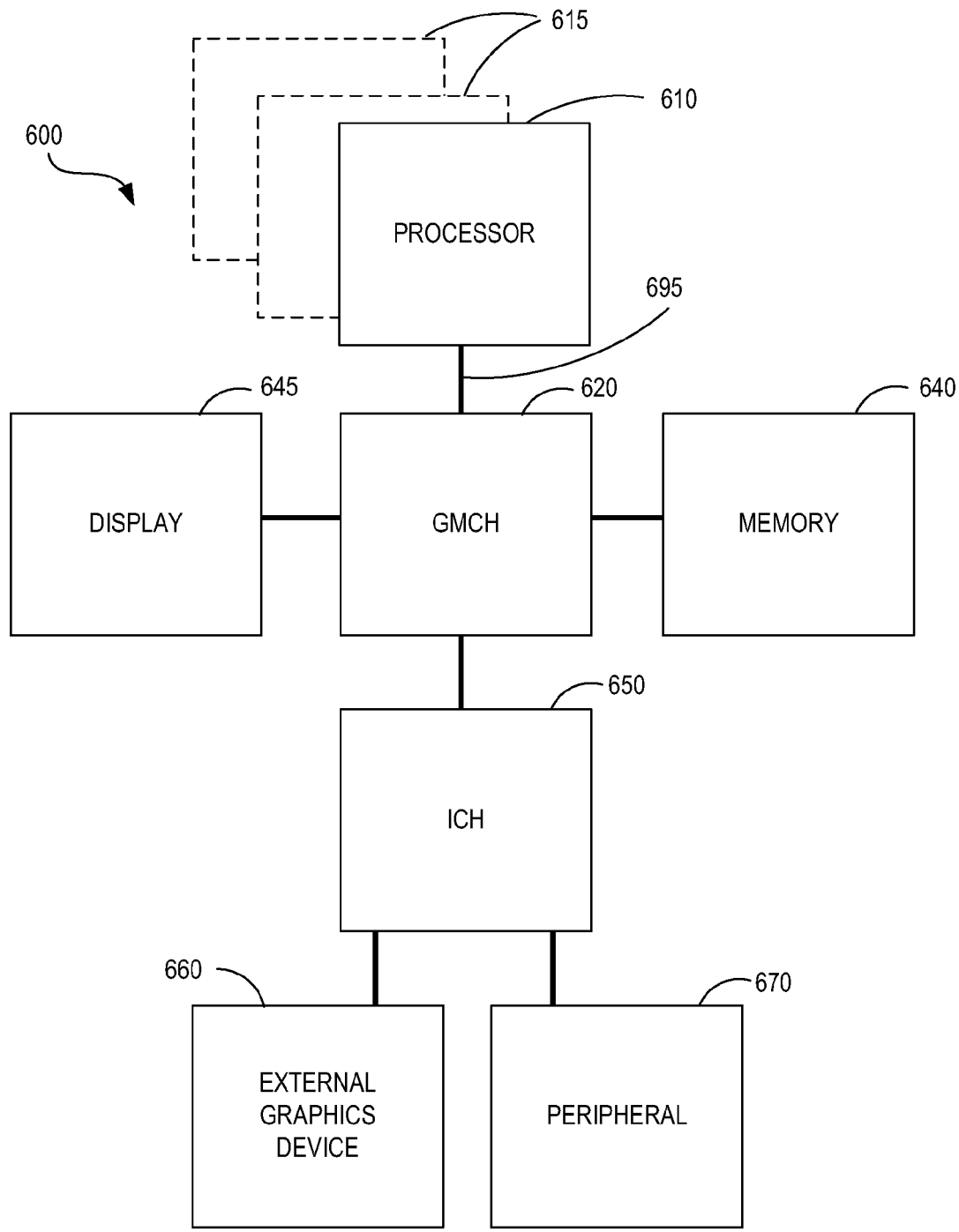
FIG. 6 is a block diagram of a computer system according to one embodiment.

Referring now to FIG. 6, shown is a block diagram of a system 600 in accordance with one embodiment of the present invention. The system 600 may include one or more processors 610, 615, which are coupled to graphics memory controller hub (GMCH) 620. The optional nature of additional processors 615 is denoted in FIG. 6 with broken lines.

Each processor 610, 615 may be some version of the circuit, integrated circuit, processor, and/or silicon integrated circuit as described above. However, it should be noted that it is unlikely that integrated graphics logic and integrated memory control units would exist in the processors 610, 615. FIG. 6 illustrates that the GMCH 620 may be coupled to a memory 640 that may be, for example, a dynamic random access memory (DRAM). The DRAM may, for at least one embodiment, be associated with a non-volatile cache.

The GMCH 620 may be a chipset, or a portion of a chipset. The GMCH 620 may communicate with the processor(s) 610, 615 and control interaction between the processor(s) 610, 615 and memory 640. The GMCH 620 may also act as an accelerated bus interface between the processor(s) 610, 615 and other elements of the system 600. For at least one embodiment, the GMCH 620 communicates with the processor(s) 610, 615 via a multi-drop bus, such as a frontside bus (FSB) 695.

Furthermore, GMCH 620 is coupled to a display 645 (such as a flat panel or touchscreen display). GMCH 620 may include an integrated graphics accelerator. GMCH 620 is further coupled to an input/output (I/O) controller hub (ICH) 650, which may be used to couple various peripheral devices to system 600. Shown for example in the embodiment of FIG. 6 is an external graphics device 660, which may be a discrete graphics device coupled to ICH 650, along with another peripheral device 670.

Alternatively, additional or different processors may also be present in the system 600. For example, additional processor(s) 615 may include additional processors(s) that are the same as processor 610, additional processor(s) that are heterogeneous or asymmetric to processor 610, accelerators (such as, e.g., graphics accelerators or digital signal processing (DSP) units), field programmable gate arrays, or any other processor. There can be a variety of differences between the processor(s) 610, 615 in terms of a spectrum of metrics of merit including architectural, micro-architectural, thermal, power consumption characteristics, and the like. These differences may effectively manifest themselves as asymmetry and heterogeneity amongst the processors 610, 615. For at least one embodiment, the various processors 610, 615 may reside in the same die package.

Figure 7:
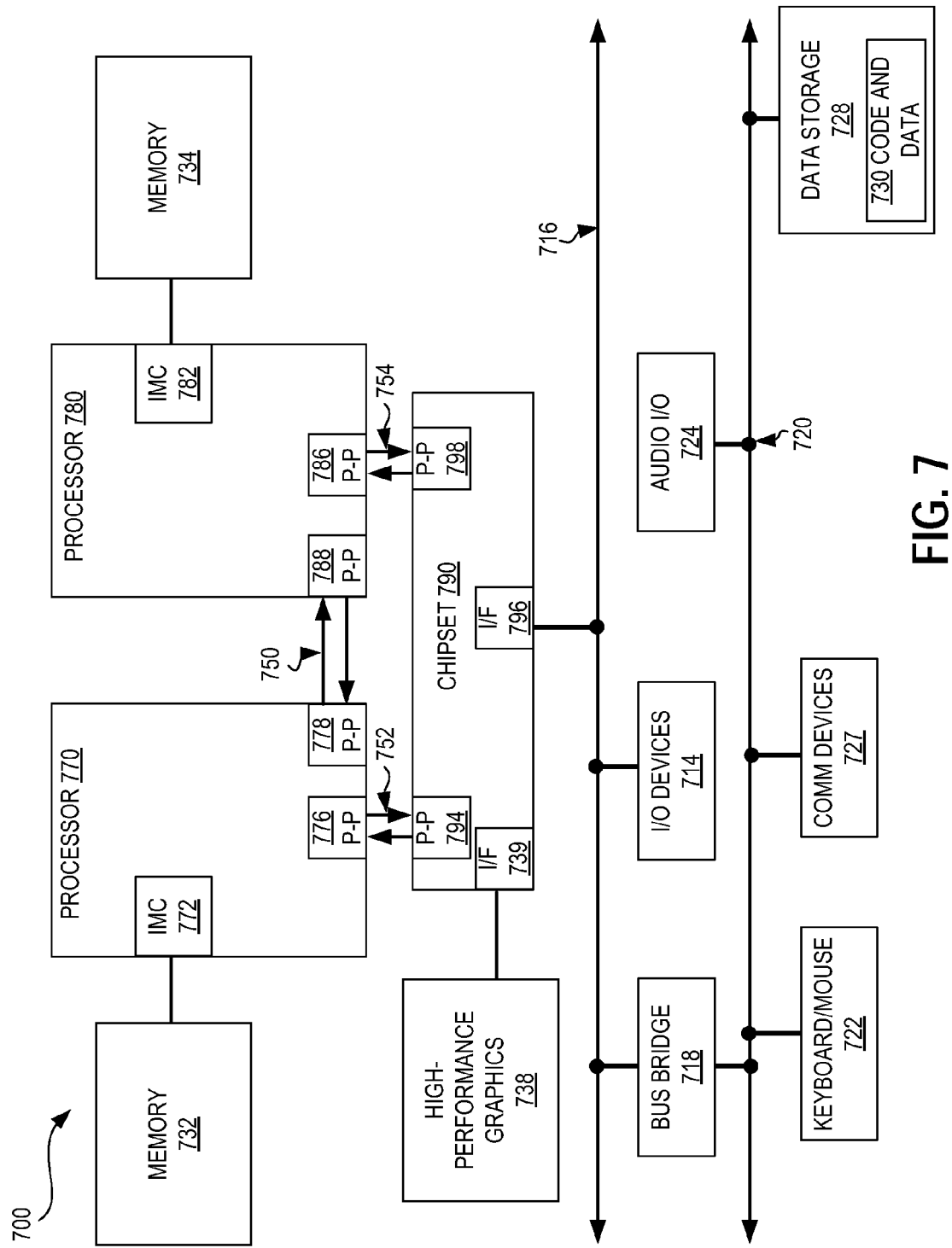
FIG. 7 is a block diagram of a computer system according to one embodiment.

Referring now to FIG. 7, shown is a block diagram of a second system 700 in accordance with an embodiment of the present invention. As shown in FIG. 7, multiprocessor system 700 is a point-to-point interconnect system, and includes a first processor 770 and a second processor 780 coupled via a point-to-point interface 750. Each of processors 770 and 780 may be some version of the processors or integrated circuits as previously described or as one or more of the processors 610, 615.

While shown with only two processors 770, 780, it is to be understood that the scope of the present invention is not so limited. In other embodiments, one or more additional processors may be present in a given processor.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present invention is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
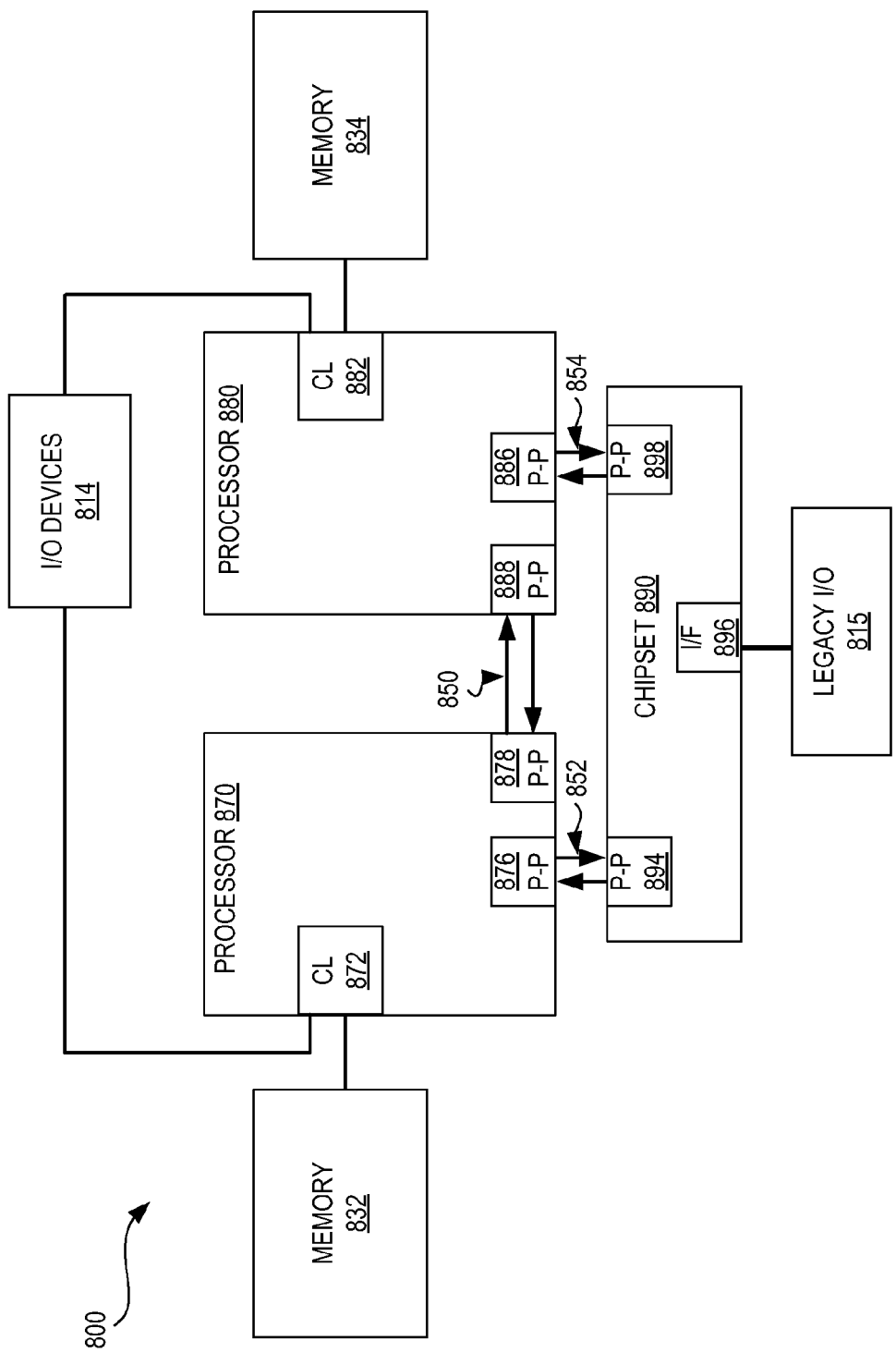
FIG. 8 is a block diagram of a computer system according to one embodiment.

Referring now to FIG. 8, shown is a block diagram of a system 800 in accordance with an embodiment of the present invention. FIG. 8 illustrates that the processors 870, 880 may include integrated memory and I/O control logic ("CL") 872 and 882, respectively and intercommunicate with each other via point-to-point interconnect 850 between point-to-point (P-P) interfaces 878 and 888 respectively. Processors 870, 880 each communicate with chipset 890 via point-to-point interconnects 852 and 854 through the respective P-P interfaces 876 to 894 and 886 to 898 as shown. For at least one embodiment, the CL 872, 882 may include integrated memory controller units. CLs 872, 882 may include I/O control logic. As depicted, memories 832, 834 coupled to CLs 872, 882 and I/O devices 814 are also coupled to the control logic 872, 882. Legacy I/O devices 815 are coupled to the chipset 890 via interface 896.

Figure 9:
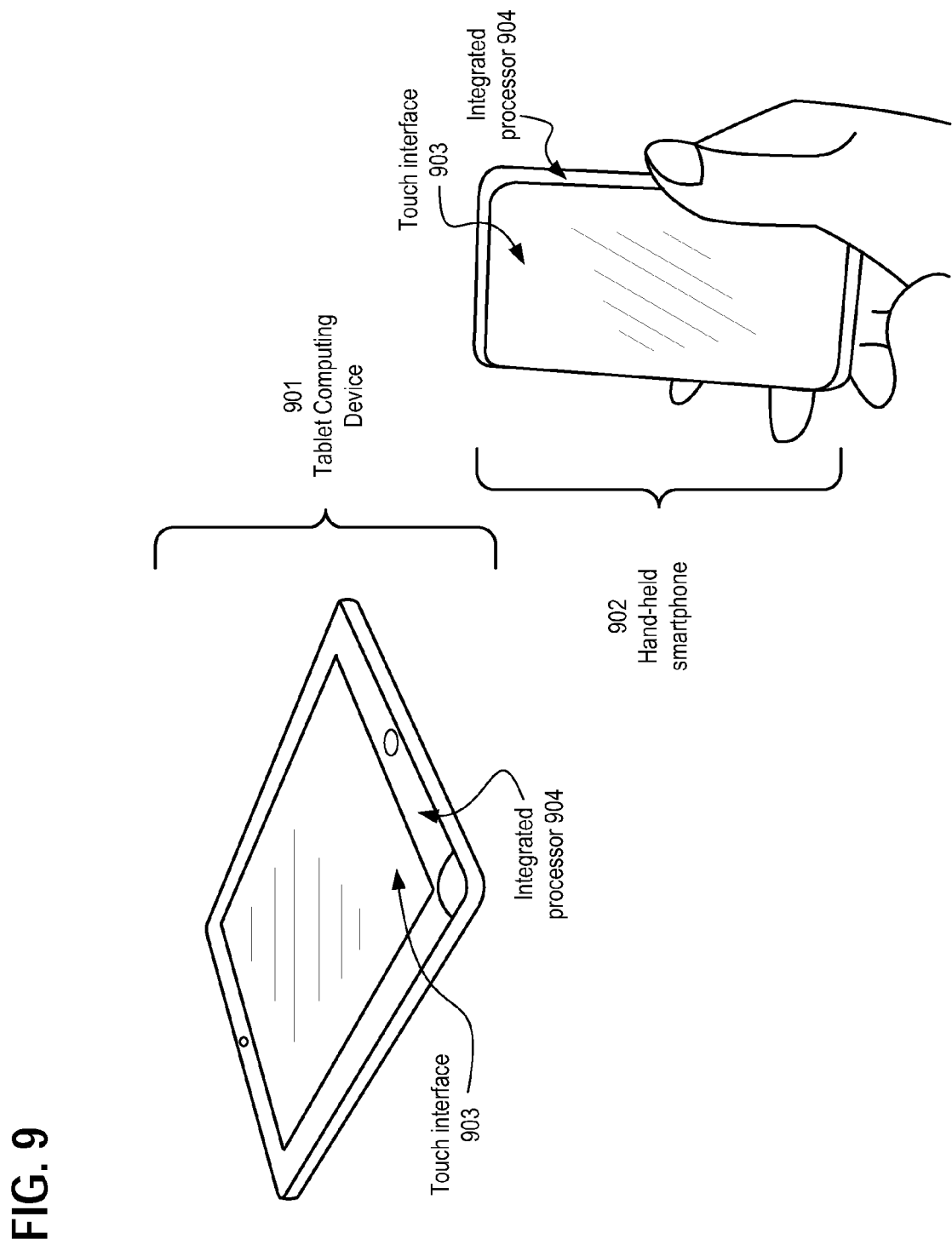
FIG. 9 depicts a tablet computing device and a hand-held smartphone each having a circuitry integrated therein as described in accordance with the embodiments.

FIG. 9 depicts a tablet computing device 901 and a hand-held smartphone 902 each having a circuitry integrated therein as described in accordance with the embodiments. As depicted, each of the tablet computing device 901 and the hand-held smartphone 902 include a touch interface 903 and an integrated processor 904 in accordance with disclosed embodiments.

For example, in one embodiment, a system embodies a tablet computing device 901 or a hand-held smartphone 902, in which a display unit of the system includes a touchscreen interface 903 for the tablet or the smartphone and further in which memory and an integrated circuit operating as an integrated processor are incorporated into the tablet or smartphone, in which the integrated processor implements one or more of the embodiments described herein for implementing a balanced P-LRU tree for a "multiple of 3" or a "multiple of 5" number of ways cache. In one embodiment, the integrated circuit described above or the depicted integrated processor of the tablet or smartphone is an integrated silicon processor functioning as a central processing unit for a tablet computing device or a smartphone.

Figure 10:
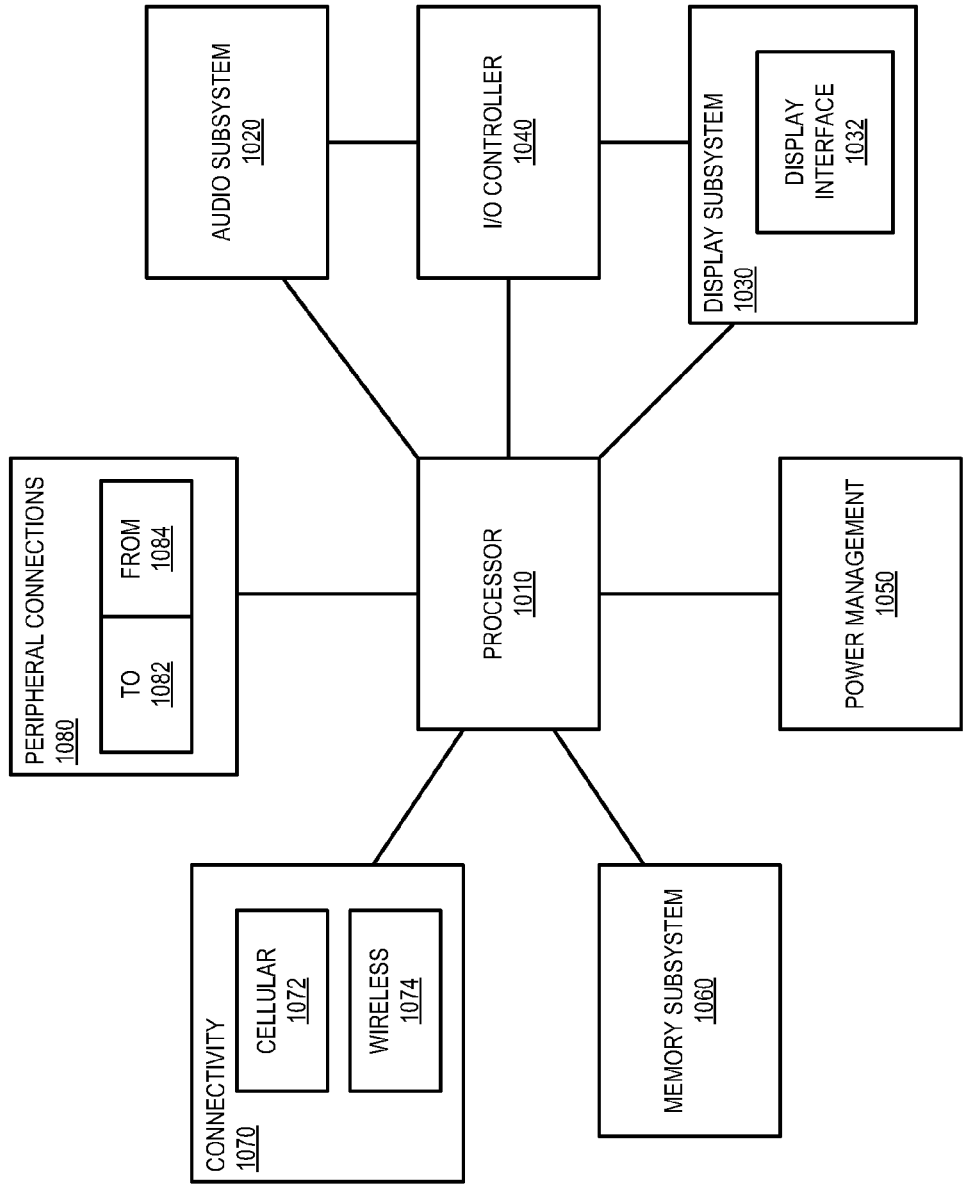
FIG. 10 is a block diagram of an embodiment of tablet computing device, a smart phone, or other mobile device in which touchscreen interface connectors are used.

FIG. 10 is a block diagram 1000 of an embodiment of tablet computing device, a smart phone, or other mobile device in which touchscreen interface connectors are used. Processor 1010 performs the primary processing operations. Audio subsystem 1020 represents hardware (e.g., audio hardware and audio circuits) and software (e.g., drivers, codecs) components associated with providing audio functions to the computing device. In one embodiment, a user interacts with the tablet computing device or smart phone by providing audio commands that are received and processed by processor 1010.

Display subsystem 1030 represents hardware (e.g., display devices) and software (e.g., drivers) components that provide a visual and/or tactile display for a user to interact with the tablet computing device or smart phone. Display subsystem 1030 includes display interface 1032, which includes the particular screen or hardware device used to provide a display to a user. In one embodiment, display subsystem 1030 includes a touchscreen device that provides both output and input to a user.

I/O controller 1040 represents hardware devices and software components related to interaction with a user. I/O controller 1040 can operate to manage hardware that is part of audio subsystem 1020 and/or display subsystem 1030. Additionally, I/O controller 1040 illustrates a connection point for additional devices that connect to the tablet computing device or smart phone through which a user might interact. In one embodiment, I/O controller 1040 manages devices such as accelerometers, cameras, light sensors or other environmental sensors, or other hardware that can be included in the tablet computing device or smart phone. The input can be part of direct user interaction, as well as providing environmental input to the tablet computing device or smart phone.

In one embodiment, the tablet computing device or smart phone includes power management 1050 that manages battery power usage, charging of the battery, and features related to power saving operation. Memory subsystem 1060 includes memory devices for storing information in the tablet computing device or smart phone. Connectivity 1070 includes hardware devices (e.g., wireless and/or wired connectors and communication hardware) and software components (e.g., drivers, protocol stacks) to the tablet computing device or smart phone to communicate with external devices. Cellular connectivity 1072 may include, for example, wireless carriers such as GSM (global system for mobile communications), CDMA (code division multiple access), TDM (time division multiplexing), or other cellular service standards). Wireless connectivity 1074 may include, for example, activity that is not cellular, such as personal area networks (e.g., Bluetooth), local area networks (e.g., WiFi), and/or wide area networks (e.g., WiMax), or other wireless communication.

Peripheral connections 1080 include hardware interfaces and connectors, as well as software components (e.g., drivers, protocol stacks) to make peripheral connections as a peripheral device ("to" 1082) to other computing devices, as well as have peripheral devices ("from" 1084) connected to the tablet computing device or smart phone, including, for example, a "docking" connector to connect with other computing devices. Peripheral connections 1080 include common or standards-based connectors, such as a Universal Serial Bus (USB) connector, DisplayPort including MiniDisplayPort (MDP), High Definition Multimedia Interface (HDMI), Firewire, etc.

Figure 11:
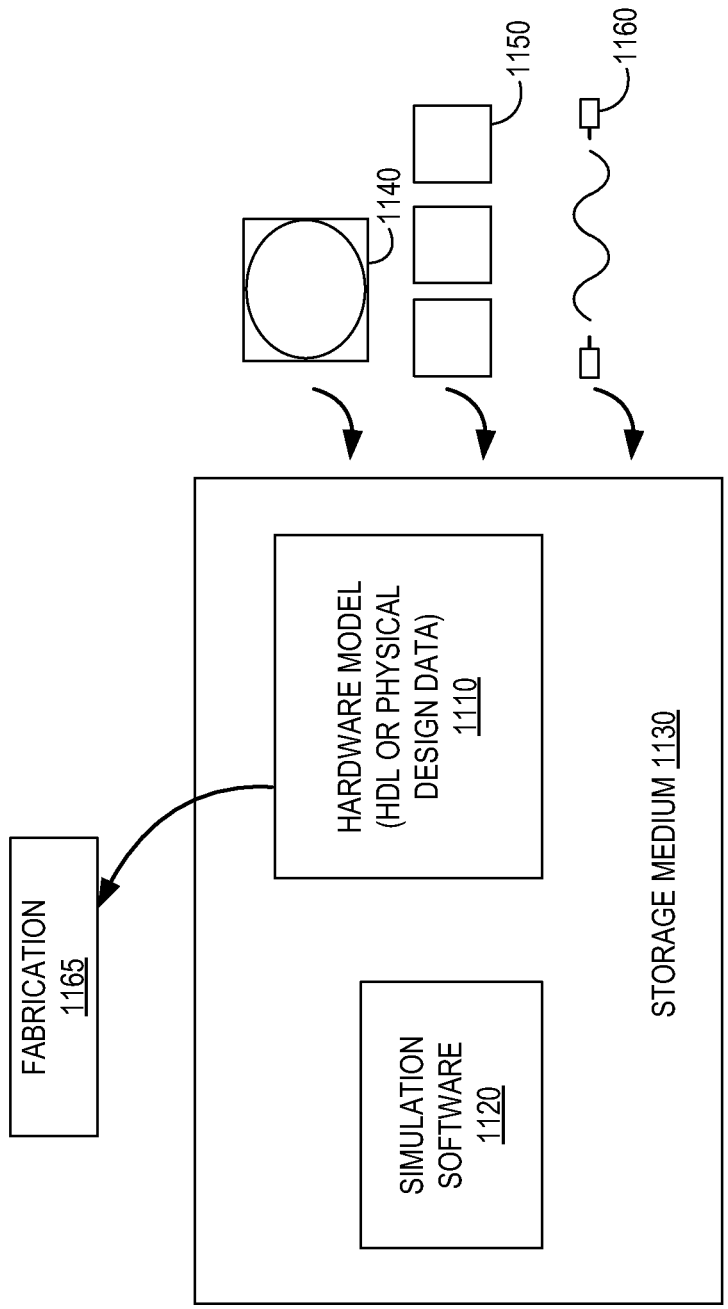
FIG. 11 is a block diagram of an IP core development system according to one embodiment.

FIG. 11 shows a block diagram illustrating the development of IP cores according to one embodiment. Storage medium 1130 includes simulation software 1120 and/or hardware or software model 1110. In one embodiment, the data representing the IP core design can be provided to the storage medium 1130 via memory 1140 (e.g., hard disk), wired connection (e.g., internet) 1150 or wireless connection 1160. The IP core information generated by the simulation tool and model can then be transmitted to a fabrication facility 1165 where it can be fabricated by a 3rd party to perform at least one instruction in accordance with at least one embodiment.

In some embodiments, one or more instructions may correspond to a first type or architecture (e.g., x86) and be translated or emulated on a processor of a different type or architecture (e.g., ARM). An instruction, according to one embodiment, may therefore be performed on any processor or processor type, including ARM, x86, MIPS, a GPU, or other processor type or architecture.

Figure 12:
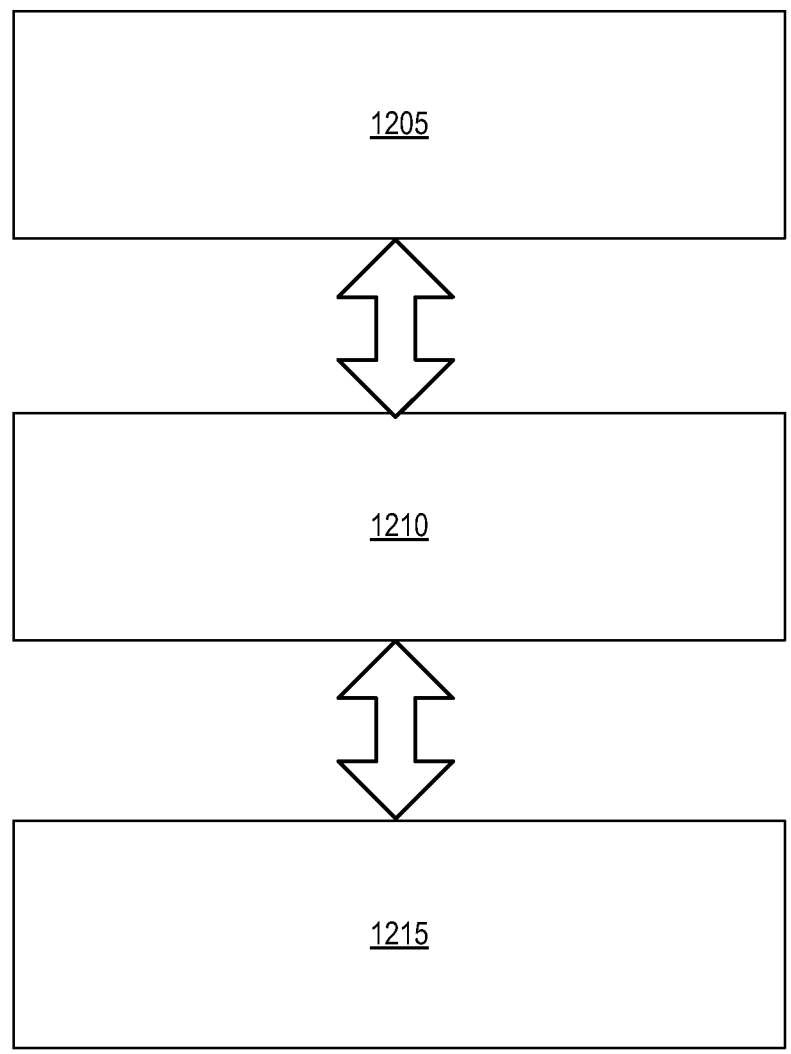
FIG. 12 illustrates an architecture emulation system according to one embodiment.

FIG. 12 illustrates how an instruction of a first type is emulated by a processor of a different type, according to one embodiment. In FIG. 12, program 1205 contains some instructions that may perform the same or substantially the same function as an instruction according to one embodiment. However the instructions of program 1205 may be of a type and/or format that is different or incompatible with processor 1215, meaning the instructions of the type in program 1205 may not be able to execute natively by the processor 1215. However, with the help of emulation logic, 1210, the instructions of program 1205 are translated into instructions that are natively capable of being executed by the processor 1215. In one embodiment, the emulation logic is embodied in hardware. In another embodiment, the emulation logic is embodied in a tangible, machine-readable medium containing software to translate instructions of the type in the program 1205 into the type natively executable by the processor 1215. In other embodiments, emulation logic is a combination of fixed-function or programmable hardware and a program stored on a tangible, machine-readable medium. In one embodiment, the processor contains the emulation logic, whereas in other embodiments, the emulation logic exists outside of the processor and is provided by a third party. In one embodiment, the processor is capable of loading the emulation logic embodied in a tangible, machine-readable medium containing software by executing microcode or firmware contained in or associated with the processor.

FIG. 13 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 13 shows a program in a high level language 1302 may be compiled using an x86 compiler 1304 to generate x86 binary code 1306 that may be natively executed by a processor with at least one x86 instruction set core 1316. The processor with at least one x86 instruction set core 1316 represents any processor that can perform substantially the same functions as a Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1304 represents a compiler that is operable to generate x86 binary code 1306 (e.g., object code) that can, with or without additional linkage processing, be executed on the processor with at least one x86 instruction set core 1316. Similarly, FIG. 13 shows the program in the high level language 1302 may be compiled using an alternative instruction set compiler 1308 to generate alternative instruction set binary code 1310 that may be natively executed by a processor without at least one x86 instruction set core 1314 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1312 is used to convert the x86 binary code 1306 into code that may be natively executed by the processor without at least one x86 instruction set core 1314. This converted code is not likely to be the same as the alternative instruction set binary code 1310 because an instruction converter capable of this is difficult to make; however, the converted code will accomplish the general operation and be made up of instructions from the alternative instruction set. Thus, the instruction converter 1312 represents software, firmware, hardware, or a combination thereof that, through emulation, simulation or any other process, allows a processor or other electronic device that does not have an x86 instruction set processor or core to execute the x86 binary code 1306.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

The invention claimed is:

1. An integrated circuit comprising:
   a plurality of ways of cache, wherein the plurality of ways comprises a quantity that is a multiple of three and not a power of two, and wherein the plurality of ways are organized into a plurality of pairs;
   a single bit for each of the plurality of pairs, wherein each single bit is to operate as an intermediate level decision node representing the associated pair of ways;
   a root level decision node comprised of exactly two individual bits to point to one of the single bits to operate as the intermediate level decision node representing an associated pair of ways; and
   wherein a total number of bits of the decision nodes is N−1, wherein N is a total number of ways in the plurality of ways and the decision nodes to determine which of the plurality of ways of cache to use.

2. The integrated circuit of claim 1, wherein each of the plurality of ways comprises a stored cache element within the cache.

3. The integrated circuit of claim 1, wherein the plurality of ways are arranged into a tree structure which is symmetrically balanced.

4. The integrated circuit of claim 1, wherein the root level decision node comprised of exactly two individual bits points to one of a leftmost, center, or rightmost single bit at the intermediate level, each of the leftmost, center, and rightmost single bits corresponding to one of the intermediate level decision nodes representing one of the plurality of pairs of ways.

5. The integrated circuit of claim 1, wherein the root level decision node comprised of exactly two individual bits comprises an information capacity to store values of 00, 01, 10, and 11, and wherein each of three of the values uniquely identify one of three of the single bits to operate as the intermediate level decision nodes, and wherein a fourth of the values is not used.

6. The integrated circuit of claim 1:
   wherein the plurality of pairs are organized as at least:
      a group A having a first pair of ways,
      a group B having a second pair of ways, and
      a group C having a third pair of ways;
   wherein a first of the single bits to operate as the intermediate level decision nodes representing one of the plurality of pairs of ways comprises a leftmost single-bit decision node of a branch to represent group A having the first pair of ways;
   wherein a second of the single bits to operate as the intermediate level decision nodes representing one of the plurality of pairs of ways comprises a middle single-bit decision node of the branch to represent group B having the second pair of ways;
   wherein a third of the single bits to operate as the intermediate level decision nodes representing one of the plurality of pairs of ways comprises a rightmost single-bit decision node of the branch to represent group C having the first pair of ways;
   wherein the root level decision node comprised of exactly two individual bits comprises legal values of 00, 01, and 10, and an illegal value of 11;
   wherein 00 maps to the leftmost single-bit decision node of the branch representing group A;
   wherein 01 maps to the middle single-bit decision node of the branch representing group B;
   wherein 10 maps to the rightmost single-bit decision node of the branch representing group C; and
   wherein cache update or hit operations and cache replace operations conform to the following rules:
      a cache update or hit operation to group A writes a value of 00 into the two bits of the root level decision node;
      a cache update or hit operation to group B writes a value of 01 into the two bits of the root level decision node;
      a cache update or hit operation to group C writes a value of 10 into the two bits of the root level decision node;
      a cache replace operation given a present value of 00 for the root level decision node replaces a way in group B;
      a cache replace operation given a present value of 01 for the root level decision node replaces a way in group C; and
      a cache replace operation given a present value of 00 for the root level decision node replaces a way in group A.

7. The integrated circuit of claim 1, wherein the integrated circuit comprises a central processing unit for one of a tablet computing device or a smartphone.

8. An integrated circuit comprising:
   a plurality of ways of cache, wherein the plurality of ways comprises a quantity that is a multiple of three and not a power of two, and wherein the plurality of ways are organized into a subgroups of three ways each;
   an intermediate level decision node representing each of the subgroups of three ways, wherein each intermediate level decision node comprises exactly two individual bits to point to one of the three ways in the subgroup associated with the intermediate level decision node;
   a root level decision node having exactly one single bit to point to one of two subordinate decision nodes; and
   wherein a total number of bits of the decision nodes is N−1, wherein N is a total number of ways in the plurality of ways and the decision nodes to determine which of the plurality of ways of cache to use.

9. The integrated circuit of claim 8, wherein each of the plurality of ways comprises a stored cache element within the cache.

10. The integrated circuit of claim 8, wherein the plurality of ways are arranged into a tree structure which is symmetrically balanced.

11. The integrated circuit of claim 8, wherein the root level decision node having exactly one single bit to point to one of two subordinate decision nodes comprises one of:
   pointers to the two subordinate decision nodes, wherein each of the subordinate decision nodes comprise exactly one single bit each to point to additional subordinate nodes at a tree structure level superior to the intermediate level occupied by the intermediate level decision nodes representing each of the subgroups of three ways; or
   pointers to the two subordinate decision nodes, wherein each of the subordinate decision nodes point directly to one of the intermediate level decision nodes representing each of the subgroups of three ways.

12. The integrated circuit of claim 8, wherein each intermediate level decision node representing an associated one of the subgroups of three ways and having the exactly two individual bits to point to one of the three ways in the associated subgroup comprises an information capacity of four unique values via the exactly two individual bits.

13. The integrated circuit of claim 12, wherein the four unique values of the intermediate level decision node are 00, 01, 10, and 11, and wherein:
- unique value 00 maps to a leftmost way of the three ways in the subgroup associated with the intermediate level decision node;
- unique value 01 maps to a middle way of the three ways in the subgroup associated with the intermediate level decision node;
- unique value 10 maps to a rightmost way of the three ways in the subgroup associated with the intermediate level decision node; and
- unique value 11 is an unused value.

14. The integrated circuit of claim 12, wherein a cache hit or cache update associated with one of the intermediate level decision nodes causes the intermediate level decision node to point to a next way among the three associated ways to the right of the way subject to the cache hit or cache update.

15. The integrated circuit of claim 12, wherein the integrated circuit implements a cache memory circuit for one of a tablet computing device or a smartphone.

16. An integrated circuit comprising:
- a plurality of ways of cache, wherein the plurality of ways comprises a quantity that is a multiple of three and not a power of two, and wherein the plurality of ways are organized into a plurality of pairs;
- a single bit for each of the plurality of pairs, wherein each single bit is to operate as an intermediate level decision node representing the associated pair of ways;
- a root level decision node comprised of exactly three individual bits to point to one of the single bits to operate as the intermediate level decision nodes representing an associated pair of ways;
- wherein the exactly three individual bits to point to one of the single bits establish full least recently used (LRU) state information for the intermediate level decision nodes representing the associated pairs of ways; and
- wherein a total number of bits of the decision nodes is N−1, wherein N is a total number of ways in the plurality of ways and the decision nodes to determine which of the plurality of ways of cache to use.

17. The integrated circuit of claim 16, further comprising:
- one or more intermediate level decision nodes to establish pseudo least recently used (LRU) state information for subordinate decision nodes or ways associated with the one or more intermediate level decision nodes; and
- wherein the root level decision node comprised of the exactly three individual bits to establish full LRU state information in combination with the one or more intermediate level decision nodes to establish pseudo LRU (PLRU) state information for the subordinate decision nodes or ways associated with the one or more intermediate level decision nodes constitutes a hybrid real LRU and PLRU model for the plurality of ways.

18. The integrated circuit of claim 16, wherein each of the plurality of ways comprises a stored cache element within the cache.

19. The integrated circuit of claim 16:
- wherein the plurality of ways are arranged into a tree structure which is symmetrically balanced; and
- wherein an actual least recently used (LRU) candidate for replacement is determinable at all times based on the full LRU state information at the intermediate level decision nodes.

20. The integrated circuit of claim 16:
- wherein any cache hit or cache update operation writes an update to exactly two of the exactly three individual bits of the root level decision node;
- wherein a first single bit of the exactly three individual bits of the root level decision node distinguishes between a left and a middle subordinate group as containing an LRU candidate;
- wherein a second single bit of the exactly three individual bits of the root level decision node distinguishes between the left and a right subordinate group as containing the LRU candidate; and
- wherein a third single bit of the exactly three individual bits of the root level decision node distinguishes between the middle and the right subordinate group as containing the LRU candidate.

21. The integrated circuit of claim 16, wherein the integrated circuit comprises a central processing unit for one of a tablet computing device or a smartphone.

22. An integrated circuit comprising:
- a plurality of ways of a cache, wherein the plurality of ways comprises a quantity that is a multiple of five and not a power of two, and wherein the plurality of ways are organized into a subgroups of five ways each and the plurality of ways are arranged into a tree structure which is symmetrically balanced;
- an intermediate level decision node representing each of the subgroups of five ways, wherein each intermediate level decision node comprises exactly three individual bits to point to one of the five ways in the subgroup associated with the intermediate level decision node; and
- a root level decision node having exactly one single bit to point to one of two subordinate decision node, wherein the decision nodes to determine which of the plurality of ways of cache to use.

23. The integrated circuit of claim 22, wherein the root level decision node having exactly one single bit to point to one of two subordinate decision nodes comprises one of:
- pointers to the two subordinate decision nodes, wherein each of the subordinate decision nodes comprise exactly one single bit each to point to additional subordinate nodes at a tree structure level superior to the intermediate level occupied by the intermediate level decision nodes representing each of the subgroups of five ways; or
- pointers to the two subordinate decision nodes, wherein each of the subordinate decision nodes point directly to one of the intermediate level decision nodes representing each of the subgroups of five ways.

24. The integrated circuit of claim 22, wherein each of the plurality of ways comprises a stored cache element within the cache.

* * * * *